United States Patent
Muramatsu et al.

(10) Patent No.: US 8,264,766 B2
(45) Date of Patent: Sep. 11, 2012

(54) WAVELENGTH CONVERSION ELEMENT, WAVELENGTH CONVERSION METHOD, PHASE MATCHING METHOD, AND LIGHT SOURCE DEVICE

(75) Inventors: Kenichi Muramatsu, Sagamihara (JP); Sunao Kurimura, Tsukuba (JP)

(73) Assignees: Nikon Corporation, Tokyo (JP); National Institute for Materials Science, Ibaraki (JP)

( * ) Notice: Subject to any disclaimer, the term of this patent is extended or adjusted under 35 U.S.C. 154(b) by 279 days.

(21) Appl. No.: 12/588,501

(22) Filed: Oct. 16, 2009

(65) Prior Publication Data
US 2010/0110534 A1   May 6, 2010

Related U.S. Application Data

(63) Continuation-in-part of application No. PCT/JP2008/057512, filed on Apr. 17, 2008.

(30) Foreign Application Priority Data

Apr. 18, 2007   (JP) ................ P2007-109127

(51) Int. Cl.
G02F 1/37 (2006.01)
G02F 1/35 (2006.01)
(52) U.S. Cl. ............... 359/328; 359/326; 385/122
(58) Field of Classification Search .......... 359/326–332; 385/122; 372/21–22
See application file for complete search history.

(56) References Cited

U.S. PATENT DOCUMENTS

| | | | |
|---|---|---|---|
| 5,412,502 A * | 5/1995 | Makio et al. ........... | 359/332 |
| 6,215,576 B1 | 4/2001 | Minemoto et al. | |
| 7,177,070 B2 * | 2/2007 | Kurimura et al. ........ | 359/326 |
| 7,261,778 B2 * | 8/2007 | Kurimura et al. ........ | 117/11 |
| 7,329,316 B2 * | 2/2008 | Kurimura et al. ........ | 117/3 |
| 2004/0181212 A1 | 9/2004 | Kurimura et al. | |
| 2004/0258109 A1 | 12/2004 | Tojo et al. | |

FOREIGN PATENT DOCUMENTS

| | | |
|---|---|---|
| EP | 1 457 814 A2 | 9/2004 |
| JP | 2004-279613 | 10/2004 |
| JP | 2005-017410 | 1/2005 |
| KR | 1998-080785 | 11/1998 |

OTHER PUBLICATIONS

Chinese Office Action mailed on Feb. 24, 2011 in corresponding Chinese Patent Application No. 200880012102.8.
European Office Action mailed on May 13, 2011 in corresponding European Patent Application No. 08 740 582.5-2205.
"Ouasi-phase-matching", Wikipedia.org, Sep. 7, 2010, retrieved from internet: http://en.wikipedia.org/wiki/Quasi-phase-matching.

(Continued)

*Primary Examiner* — Daniel Petkovsek

(57) ABSTRACT

A wavelength conversion element is provided as one including a monocrystalline nonlinear optical crystal. The nonlinear optical crystal has: a plurality of first regions having a polarity direction along a predetermined direction; a plurality of second regions having a polarity direction opposite to the predetermined direction; an entrance face into which a fundamental incident wave having a wavelength λ and a frequency ω is incident in a direction substantially perpendicular to the predetermined direction; and an exit face from which a second harmonic with a frequency 2ω generated in the crystal emerges. The plurality of first and second regions are formed as alternately arranged in a period substantially equal to d expressed by a predetermined expression, between the entrance face and the exit face.

8 Claims, 19 Drawing Sheets

OTHER PUBLICATIONS

B. Boulanger, et al., "Optical Harmonic Generation Parametric Devices", from "Wiley Encyclopedia of Electrical and Electronics Engineering", John Wiley & Sons, pp. 278-296, 1999.

English Translation of the International Preliminary Report on Patentability, dated Nov. 19, 2009.

Yamada T., et al., "Harmonic generation characteristics of QPM quartz in visibile-to-UV region", Quantum Electronics and Laser Science Conference, vol. 2, May 22-27, 2005, JTuC38, pp. 891-893.

Harada M. et al., "Efficient quasi-phase matching in periodically-twinned quartz", Conference on Lasers & Electronic-Optics, vol. 1, May 22-27, 2005, CMW6, pp. 405-406.

European Search Report dated Sep. 30, 2010 and issued in corresponding European Patent Application 08740582.5.

Masaki Harada et al., "Quasi-phase matched second harmonic generation in crystal quartz", Proceedings of SPIE, vol. 5633, Bellingham DOI: 10/117/12/575565, 2005, pp. 40-54, XP040196552.

H.J. Simon et al., "Second-Harmonic Light Generation in Crystals With Natural Optical Activity", Physical Review, vol. 171, No. 3, Jul. 15, 1968, pp. 1104-1114, XP009131767.

Paul Bey et al., "Coupled-Wave Solution of Harmonic Generation in Optically Active Medium", Physical Review, vol. 162, No. 3, Oct. 15, 1967, pp. 794-800, XP002576764.

N. Bloembergen, "Conservation of Angular Momentum of Optical Processes in Crystals", Polarization, Matiere et Rayonnement, 1969, pp. 109-119, XP009131787.

Korean Office Action mailed Dec. 8, 2011 issued in corresponding Korean Patent Application No. 10-2009-7024003.

International Search Report mailed Jul. 22, 2008 and issued in corresponding International Search Report PCT/JP2008/057512.

* cited by examiner

Fig.4
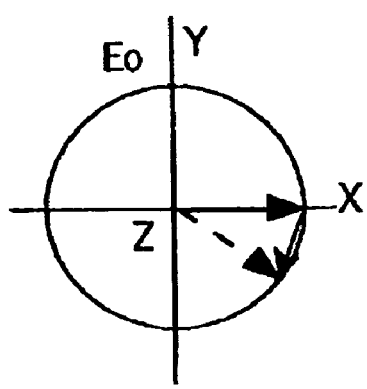
(a)
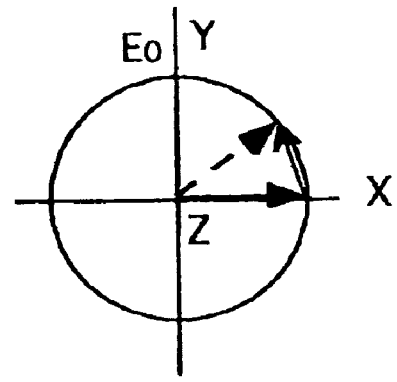
(b)

Fig.6
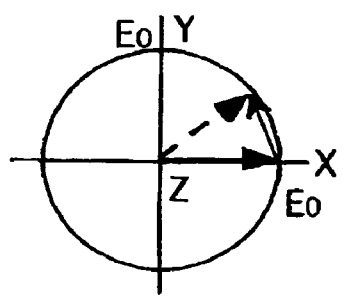 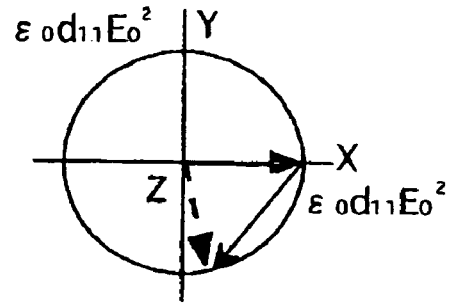
(a)            (b)

WAVELENGTH CONVERSION ELEMENT, WAVELENGTH CONVERSION METHOD, PHASE MATCHING METHOD, AND LIGHT SOURCE DEVICE

CROSS-REFERENCE TO RELATED APPLICATIONS

This is a continuation-in-part application of a PCT application No. PCT/JP2008/057512 filed on Apr. 17, 2008, claiming the benefit of priorities from Japanese Patent application No. 2007-109127 filed on Apr. 18, 2007, and incorporated by reference in their entirety.

BACKGROUND

1. Field

The present invention relates to a wavelength conversion element, a wavelength conversion method, a phase matching method, and a light source device.

2. Description of the Related Art

There are known methods using nonlinear optical crystals as wavelength conversion elements for generating a second harmonic by making use of the second-order nonlinear optical effect (Second harmonic generation; SHG). The nonlinear optical effect is an effect resulting from nonlinearity of polarization response of a substance, and refers to such a phenomenon that when strong light like a laser beam is incident into the substance, the response of polarization becomes unproportional to the electric field of the incident light and part of the incident light is subjected to wavelength conversion.

The second harmonic actually generated comes to have a wavelength a little shorter than half of the wavelength of the incident light because of the dispersion characteristic of the crystal. For this reason, phases of second harmonics become gradually shifted from each other and as a consequence, the second harmonics come to cancel each other. In this case, it is difficult to generate the second harmonic in a satisfactory light quantity.

A proposal for obtaining the second harmonic in a satisfactory light quantity is phase matching (see Valentin G Dmitriev, Gagik G. Gurzadyan, and David N. Nikogosyan, "Handbook of Nonlinear Optical Crystals (second, revised and updated edition)," published by Springer-Verlag, 1997, p 3-p 14). Quasi phase matching is a method of forming a polarity inversion structure in a crystal so as to avoid the cancellation of the electric fields between second harmonics, and thereby changing the polarities in directions where the electric fields do not cancel each other, to achieve quasi phase matching, thereby generating the second harmonic.

Incidentally, there arises a new problem in the phase matching with a nonlinear optical crystal having an optical rotatory power. The phenomenon of the optical rotatory power appears in such a manner that, for example, linearly polarized light traveling in the nonlinear optical crystal such as a quartz crystal rotates its vibration plane (more precisely, the vibration plane of the electric field of the light, which will be referred to hereinafter as the vibration plane) while it remains as linearly polarized light. An angle of the rotation is proportional to a distance (optical path length) of travel in the crystal and the rotation angle increases with decrease in wavelength in the visible to ultraviolet wavelength region. At this time, whether the light rotates clockwise or counterclockwise in the quartz crystal is determined by whether the quartz crystal is right-handed quartz or left-handed quartz.

The optical rotatory power is an intrinsic phenomenon in crystals and a level of effect thereof differs depending upon individual materials, but the presence or absence, and the anisotropy of behavior in the presence case are phenomena uniquely determined from the symmetry of crystal structure.

In the nonlinear optical crystal having the optical rotatory power, as described above, second harmonics in the same phase but with different directions of electric fields are reproduced according to a length of an element. If the phase matching is achieved without optical rotatory power, directions of electric fields of these second harmonics are aligned and they are superimposed to establish a reinforcing relation. In the phase matching with the nonlinear optical crystal having the optical rotatory power, however, the simple addition does not hold because the second harmonics have different directions of electric fields while being in the same phase.

The present invention has been accomplished under such circumstances and an object of the present invention is thus to provide a wavelength conversion element, wavelength conversion method, and light source device capable of efficiently generating a second harmonic from a fundamental wave.

SUMMARY

A wavelength conversion element of an embodiment according to the present invention is a wavelength conversion element comprising a monocrystalline nonlinear optical crystal belonging to point group 32 or point group 3, wherein the nonlinear optical crystal has: a plurality of first regions having a polarity direction along a predetermined direction; a plurality of second regions having a polarity direction opposite to the predetermined direction; an entrance face into which a fundamental incident wave having a wavelength λ and a frequency ω is incident in a direction substantially perpendicular to the predetermined direction; and an exit face from which a second harmonic with a frequency 2ω generated in the crystal emerges, and wherein the plurality of first and second regions are formed as alternately arranged in a period substantially equal to d expressed by Formula (1) or Formula (2) below, along a Z-axis direction of the crystal between the entrance face and the exit face,

[Math 1]

$$d = \frac{m\lambda}{2(n^+(2\omega) - n^-(\omega))} \quad (1)$$

$$d = \frac{m\lambda}{2(n^-(2\omega) - n^+(\omega))} \quad (2)$$

where $n^+(2\omega)$ is a refractive index of right-handed circularly polarized light in the Z-axis direction of the nonlinear optical crystal for the second harmonic, $n^+(\omega)$ a refractive index of right-handed circularly polarized light in the Z-axis direction of the nonlinear optical crystal for the fundamental incident wave, $n^-(2\omega)$ a refractive index of left-handed circularly polarized light in the Z-axis direction of the nonlinear optical crystal for the second harmonic, $n^-(\omega)$ a refractive index of left-handed circularly polarized light in the Z-axis direction of the nonlinear optical crystal for the fundamental incident wave, and m an order of QPM (quasi phase matching) and natural number.

In the present specification, the period substantially equal to d refers to a period taking a value falling in a range of deviation between −2% and +2% both inclusive with respect to d, i.e., a period of not less than 0.98×d and not more than 1.02×d. In the present specification, making the fundamental incident wave incident in the direction substantially perpendicular to the polarity direction refers to making the fundamental incident wave incident in a direction within a range of deviation of not more than 3° from the direction perpendicular to the polarity direction, and more preferably, within a range of deviation of not more than 2°.

In this case, the nonlinear optical crystal may be a quartz crystal. The wavelength conversion element may further comprise a quarter wave plate, and the quarter wave plate may be arranged so that the fundamental incident wave having passed through the quarter wave plate is made incident into the entrance face.

A wavelength conversion method according to an embodiment of the present invention is a wavelength conversion method of making a fundamental incident wave having a wavelength $\lambda$ and a frequency $\omega$, incident into a wavelength conversion element comprising a monocrystalline nonlinear optical crystal belonging to point group 32 or point group 3, and obtaining a second harmonic with a frequency $2\omega$ emitted from the wavelength conversion element, thereby to achieve wavelength conversion, the method comprising: a step of preparing the wavelength conversion element which has a plurality of first regions having a polarity direction along a predetermined direction, and a plurality of second regions having a polarity direction opposite to the predetermined direction, and in which the plurality of first and second regions are formed as alternately arranged in a period substantially equal to d expressed by Formula (1) or Formula (2) below, along a Z-axis direction of the crystal; and a step of making the fundamental incident wave incident as circularly polarized light from a direction substantially perpendicular to the predetermined direction, into the wavelength conversion element to obtain the second harmonic,

[Math 2]

$$d = \frac{m\lambda}{2(n^+(2\omega) - n^-(\omega))} \quad (1)$$

$$d = \frac{m\lambda}{2(n^-(2\omega) - n^+(\omega))} \quad (2)$$

where $n^+(2\omega)$ is a refractive index of right-handed circularly polarized light in the Z-axis direction of the nonlinear optical crystal for the second harmonic, $n^+(\omega)$ a refractive index of right-handed circularly polarized light in the Z-axis direction of the nonlinear optical crystal for the fundamental incident wave, $n^-(2\omega)$ a refractive index of left-handed circularly polarized light in the Z-axis direction of the nonlinear optical crystal for the second harmonic, $n^-(\omega)$ a refractive index of left-handed circularly polarized light in the Z-axis direction of the nonlinear optical crystal for the fundamental incident wave, and m an order of QPM (quasi phase matching) and natural number.

Another wavelength conversion element according to an embodiment of the present invention is a wavelength conversion element comprising a monocrystalline nonlinear optical crystal having an optical rotatory power, wherein the nonlinear optical crystal has: a plurality of first regions having a polarity direction along a predetermined direction; a plurality of second regions having a polarity direction opposite to the predetermined direction; an entrance face into which a fundamental incident wave having a wavelength $\lambda$ and a frequency $\omega$ is incident in a direction substantially perpendicular to the predetermined direction; and an exit face from which a second harmonic with a frequency $2\omega$ generated in the crystal emerges, and wherein the plurality of first and second regions are formed as alternately arranged in a period substantially equal to d expressed by Formula (3), Formula (4), Formula (5), or Formula (6) below, between the entrance face and the exit face,

[Math 3]

$$d = \frac{m\lambda}{2(n_1(2\omega) - n_1(\omega))} \quad (3)$$

$$d = \frac{m\lambda}{2(n_1(2\omega) - n_2(\omega))} \quad (4)$$

$$d = \frac{m\lambda}{2(n_2(2\omega) - n_1(\omega))} \quad (5)$$

$$d = \frac{m\lambda}{2(n_2(2\omega) - n_2(\omega))} \quad (6)$$

where $n_1$ and $n_2$ are refractive indices of two orthogonal eigen-polarizations in a ray direction of the nonlinear optical crystal, $n_1(2\omega)$ a refractive index of the nonlinear optical crystal for the second harmonic, $n_1(\omega)$ a refractive index of the nonlinear optical crystal for the fundamental incident wave, $n_2(2\omega)$ a refractive index of the nonlinear optical crystal for the second harmonic, $n_2(\omega)$ a refractive index of the nonlinear optical crystal for the fundamental incident wave, and m an order of QPM (quasi phase matching) and natural number.

In this case, the nonlinear optical crystal may be a quartz crystal. The wavelength conversion element may further comprise a quarter wave plate, and the quarter wave plate may be arranged so that the fundamental incident wave having passed through the quarter wave plate is made incident into the entrance face.

Another wavelength conversion method according to the present invention is a wavelength conversion method of making a fundamental incident wave having a wavelength $\lambda$ and a frequency $\omega$, incident into a wavelength conversion element comprising a monocrystalline nonlinear optical crystal having an optical rotatory power, and obtaining a second harmonic with a frequency $2\omega$ emitted from the wavelength conversion element, thereby to achieve wavelength conversion, the method comprising: a step of preparing the wavelength conversion element which has a plurality of first regions having a polarity direction along a predetermined direction, and a plurality of second regions having a polarity direction opposite to the predetermined direction, and in which the plurality of first and second regions are formed as alternately arranged in a period substantially equal to d expressed by Formula (3), Formula (4), Formula (5), or Formula (6) below; and a step of making the fundamental incident wave incident from a direction substantially perpendicular to the predetermined direction and crystal orientation in which an ellipticity $\gamma$ of eigen-polarizations of the crystal is less than 0.1, into the wavelength conversion element to obtain the second harmonic,

[Math 4]

$$d = \frac{m\lambda}{2(n_1(2\omega) - n_1(\omega))} \quad (3)$$

$$d = \frac{m\lambda}{2(n_1(2\omega) - n_2(\omega))} \quad (4)$$

$$d = \frac{m\lambda}{2(n_2(2\omega) - n_1(\omega))} \quad (5)$$

$$d = \frac{m\lambda}{2(n_2(2\omega) - n_2(\omega))} \quad (6)$$

where $n_1$ and $n_2$ are refractive indices of two orthogonal eigen-polarizations in a ray direction of the nonlinear optical crystal, $n_1(2\omega)$ a refractive index of the nonlinear optical crystal for the second harmonic, $n_1(\omega)$ a refractive index of the nonlinear optical crystal for the fundamental incident wave, $n_2(2\omega)$ a refractive index of the nonlinear optical crystal for the second harmonic, $n_2(\omega)$ a refractive index of the nonlinear optical crystal for the fundamental incident wave, and m an order of QPM (quasi phase matching) and natural number.

Still another wavelength conversion method according to an embodiment of the present invention is a wavelength conversion method of making a fundamental incident wave having a wavelength $\lambda$ and a frequency $\omega$, incident into a wavelength conversion element comprising a monocrystalline nonlinear optical crystal having an optical rotatory power, and obtaining a second harmonic with a frequency $2\omega$ emitted from the wavelength conversion element, thereby to achieve wavelength conversion, the method comprising: a step of preparing the wavelength conversion element which has a plurality of first regions having a polarity direction along a predetermined direction, and a plurality of second regions having a polarity direction opposite to the predetermined direction, and in which the plurality of first and second regions are formed as alternately arranged in a period substantially equal to d expressed by Formula (3), Formula (4), Formula (5), or Formula (6) below; and a step of making the fundamental incident wave incident as elliptically polarized light from a direction substantially perpendicular to the predetermined direction, into the wavelength conversion element to obtain the second harmonic,

[Math 5]

$$d = \frac{m\lambda}{2(n_1(2\omega) - n_1(\omega))} \quad (3)$$

$$d = \frac{m\lambda}{2(n_1(2\omega) - n_2(\omega))} \quad (4)$$

$$d = \frac{m\lambda}{2(n_2(2\omega) - n_1(\omega))} \quad (5)$$

$$d = \frac{m\lambda}{2(n_2(2\omega) - n_2(\omega))} \quad (6)$$

where $n_1$ and $n_2$ are refractive indices of two orthogonal eigen-polarizations in a ray direction of the nonlinear optical crystal, $n_1(2\omega)$ a refractive index of the nonlinear optical crystal for the second harmonic, $n_1(\omega)$ a refractive index of the nonlinear optical crystal for the fundamental incident wave, $n_2(2\omega)$ a refractive index of the nonlinear optical crystal for the second harmonic, $n_2(\omega)$ a refractive index of the nonlinear optical crystal for the fundamental incident wave, and m an order of QPM (quasi phase matching) and natural number.

Still another wavelength conversion element according to an embodiment of the present invention is a wavelength conversion element comprising a monocrystalline nonlinear optical crystal having an optical rotatory power, wherein the nonlinear optical crystal has: a plurality of first regions having a polarity direction along a predetermined direction; a plurality of second regions having a polarity direction opposite to the predetermined direction; an entrance face into which a fundamental incident wave having a wavelength $\lambda$ and a frequency $\omega$ is incident in a direction substantially perpendicular to the predetermined direction; and an exit face from which a second harmonic with a frequency $2\omega$ generated in the crystal emerges, and wherein the plurality of first and second regions are formed as alternately arranged in a period substantially equal to d expressed by Formula (7), Formula (8), Formula (9), or Formula (10) below, between the entrance face and the exit face,

[Math 6]

$$d = \frac{m\lambda}{2(n_{1G=0}(2\omega) - n_{1G=0}(\omega))} \quad (7)$$

$$d = \frac{m\lambda}{2(n_{1G=0}(2\omega) - n_{2G=0}(\omega))} \quad (8)$$

$$d = \frac{m\lambda}{2(n_{2G=0}(2\omega) - n_{1G=0}(\omega))} \quad (9)$$

$$d = \frac{m\lambda}{2(n_{2G=0}(2\omega) - n_{2G=0}(\omega))} \quad (10)$$

where $n_{1G=0}$ and $n_{2G=0}$ are refractive indices of two orthogonal eigen-polarizations of the nonlinear optical crystal in crystal orientations where G is substantially 0, $n_{1G=0}(2\omega)$ a refractive index of the nonlinear optical crystal for the second harmonic, $n_{1G=0}(2\omega)$ a refractive index of the nonlinear optical crystal for the fundamental incident wave, $n_{2G=0}(2\omega)$ a refractive index of the nonlinear optical crystal for the second harmonic, $n_{2c=0}(\omega)$ a refractive index of the nonlinear optical crystal for the fundamental incident wave, and m an order of QPM (quasi phase matching) and natural number.

Furthermore, G is a quantity defined as follows:

[Math 7]

$$G = \sum_{i=1}^{3} \sum_{j=1}^{3} g_{ij} a_i a_j$$

where $g_{ij}$ is an ij entry in a gyration tensor of the nonlinear optical crystal of interest, and $a_i$ and $a_j$ are components of a normal vector to a wavefront of the fundamental incident wave. In the present specification, a range substantially equal to G=0 corresponds to a range of $0 \leq G \leq 1.135 \times 10^{-4}$.

In this case, the nonlinear optical crystal may be a quartz crystal. The wavelength conversion element may further comprise a quarter wave plate, and the quarter wave plate may be arranged so that the fundamental incident wave having passed through the quarter wave plate is made incident into the entrance face.

Still another wavelength conversion method according to an embodiment of the present invention is a wavelength conversion method of making a fundamental incident wave having a wavelength $\lambda$ and a frequency $\omega$, incident into a wavelength conversion element comprising a monocrystalline nonlinear optical crystal having an optical rotatory power, and obtaining a second harmonic with a frequency $2\omega$ emitted from the wavelength conversion element, thereby to achieve wavelength conversion, the method comprising: a step of preparing the wavelength conversion element which has a plurality of first regions having a polarity direction along a predetermined direction, and a plurality of second regions having a polarity direction opposite to the predetermined direction, and in which the plurality of first and second regions are formed as alternately arranged in a period substantially equal to d expressed by Formula (7), Formula (8), Formula (9), or Formula (10) below; and a step of making the fundamental incident wave incident as elliptically polarized light from a direction substantially perpendicular to the predetermined direction and crystal orientation satisfying a condition that G is substantially 0, into the wavelength conversion element to obtain the second harmonic,

[Math 8]

$$d = \frac{m\lambda}{2(n_{1G=0}(2\omega) - n_{1G=0}(\omega))} \quad (7)$$

$$d = \frac{m\lambda}{2(n_{1G=0}(2\omega) - n_{2G=0}(\omega))} \quad (8)$$

$$d = \frac{m\lambda}{2(n_{2G=0}(2\omega) - n_{1G=0}(\omega))} \quad (9)$$

$$d = \frac{m\lambda}{2(n_{2G=0}(2\omega) - n_{2G=0}(\omega))} \quad (10)$$

where $n_{1G=0}$ and $n_{2G=0}$ are refractive indices of two orthogonal eigen-polarizations of the nonlinear optical crystal in crystal orientations where G is substantially 0, $n_{1G=0}(2\omega)$ a refractive index of the nonlinear optical crystal for the second harmonic, $n_{1G=0}(\omega)$ a refractive index of the nonlinear optical crystal for the fundamental incident wave, $n_{2G=0}(2\omega)$ a refractive index of the nonlinear optical crystal for the second harmonic, $n_{2G=0}(\omega)$ a refractive index of the nonlinear optical crystal for the fundamental incident wave, and m an order of QPM (quasi phase matching) and natural number.

Furthermore, G is a quantity defined as follows:

[Math 9]

$$G = \sum_{i=1}^{3} \sum_{j=1}^{3} g_{ij} a_i a_j$$

where $g_{ij}$ is an ij entry in a gyration tensor of the nonlinear optical crystal of interest, and $a_i$ and $a_j$ are components of a normal vector to a wavefront of the fundamental incident wave.

Still another wavelength conversion element according to the present invention is a wavelength conversion element comprising a nonlinear optical crystal of a monocrystalline quartz crystal, wherein the nonlinear optical crystal has: a plurality of first regions having a polarity direction along a predetermined direction; a plurality of second regions having a polarity direction opposite to the predetermined direction; an entrance face into which a fundamental incident wave having a wavelength $\lambda$ and a frequency $\omega$ is incident from a direction substantially perpendicular to the predetermined direction and crystal orientation satisfying a condition that G is substantially 0; and an exit face from which a second harmonic with a frequency $2\omega$ generated in the crystal emerges, and wherein the plurality of first and second regions are formed as alternately arranged in a period substantially equal to d expressed by Formula (11) or Formula (12) below, between the entrance face and the exit face,

[Math 10]

$$d = \frac{m\lambda}{2(n_0(2\omega) - n_o(\omega))} \quad (11)$$

$$d = \frac{m\lambda}{2(n_\theta(2\omega) - n_o(\omega))} \quad (12)$$

where $n_e(2\omega)$ is a refractive index of the nonlinear optical crystal for an extraordinary ray of the second harmonic, $n_o(\omega)$ a refractive index of the nonlinear optical crystal for an ordinary ray of the fundamental incident wave, $n_o(2\omega)$ a refractive index of the nonlinear optical crystal for an ordinary ray of the second harmonic, $n_\theta(2\omega)$ a numerical value for the second harmonic expressed by the following expression where $\theta$ is an angle of inclination of a normal vector to a wavefront of the fundamental incident wave, from the c axis (or Z-axis):

[Math 11]

$$n_\theta(2\omega) = \sqrt{\frac{n_0^2(2\omega) \times n_e^2(2\omega)}{n_e(2\omega)^2 \cos^2(\theta) + n_0(2\omega)^2 \sin^2(\theta)}}$$

($n_e(2\omega)$ is the refractive index of the nonlinear optical crystal for the extraordinary ray of the second harmonic), and m an order of QPM (quasi phase matching) and natural number, and where when G=0, the angle $\theta$ of inclination of the normal vector to the wavefront of the fundamental incident wave incident into the nonlinear optical crystal, from the c axis (or Z-axis) satisfies the following expression:

[Math 12]

$$\theta = \tan^{-1}\left[-\frac{g_{33}}{g_{11}}\right]$$

where $g_{ij}$ is an ij entry in a gyration tensor of the nonlinear optical crystal of interest, and $a_i$ and $a_j$ are components of the normal vector to the wavefront of the fundamental incident wave.

Still another wavelength conversion method according to the present invention is a wavelength conversion method of making a fundamental incident wave having a wavelength $\lambda$ and a frequency $\omega$, incident into a wavelength conversion element comprising a nonlinear optical crystal of a monocrystalline quartz crystal, and obtaining a second harmonic with a frequency $2\omega$ emitted from the wavelength conversion element, thereby to achieve wavelength conversion, the method comprising: a step of preparing the wavelength conversion element which has a plurality of first regions having a polarity direction along a predetermined direction, and a plurality of second regions having a polarity direction opposite to the predetermined direction, and in which the plurality of first and second regions are formed as alternately arranged in a period substantially equal to d expressed by Formula (11) or Formula (12) below; and a step of making the fundamental incident wave incident as elliptically polarized light from a direction substantially perpendicular to the predetermined direction and crystal orientation satisfying a condition that G is substantially 0, into the wavelength conversion element to obtain the second harmonic,

[Math 13]

$$d = \frac{m\lambda}{2(n_0(2\omega) - n_o(\omega))} \quad (11)$$

$$d = \frac{m\lambda}{2(n_\theta(2\omega) - n_o(\omega))} \quad (12)$$

where $n_e(2\omega)$ is a refractive index of the nonlinear optical crystal for an extraordinary ray of the second harmonic, $n_o(\omega)$ a refractive index of the nonlinear optical crystal for an ordinary ray of the fundamental incident wave, $n_o(2\omega)$ a refractive index of the nonlinear optical crystal for an ordinary ray of the second harmonic, $n_\theta(2\omega)$ a numerical value for the second harmonic expressed by the following expression where $\theta$ is an angle of inclination of a normal vector to a wavefront of the fundamental incident wave, from the c axis (or Z-axis):

[Math 14]

$$n_\theta(2\omega) = \sqrt{\frac{n_0^2(2\omega) \times n_e^2(2\omega)}{n_e(2\omega)^2 \cos^2(\theta) + n_o(2\omega)^2 \sin^2(\theta)}}$$

($n_e(2\omega)$) is the refractive index of the nonlinear optical crystal for the extraordinary ray of the second harmonic), and m an order of QPM (quasi phase matching) and natural number, and where when G=0, the angle $\theta$ of inclination of the normal vector to the wavefront of the fundamental incident wave incident into the nonlinear optical crystal, from the c axis (or Z-axis) satisfies the following expression:

[Math 15]

$$\theta = \tan^{-1}\left[-\frac{g_{33}}{g_{11}}\right]$$

where $g_{ij}$ is an ij entry in a gyration tensor of the nonlinear optical crystal of interest, and $a_i$ and $a_j$ are components of the normal vector to the wavefront of the fundamental incident wave.

A light source device according to the present invention is a light source device comprising a laser light source and a wavelength conversion element, in which the wavelength conversion element generates and emits a second harmonic of a laser beam emitted from the laser light source, wherein the wavelength conversion element is the wavelength conversion element as set forth.

Furthermore, a first means for solving the above problem is a wavelength conversion element wherein in a nonlinear optical crystal belonging to point group 32 or point group 3, which is a monocrystal having the positive polarity in a predetermined direction, a periodic polarity inversion structure in which the positive and negative polarities periodically alternate in a Z-axis direction in a width (d) expressed by Formula (1) or Formula (2) below, is formed, and wherein a direction of incidence of incident light is a direction perpendicular to the polarity direction,

[Math 16]

$$d = \frac{m\lambda}{2(n^+(2\omega) - n^-(\omega))} \quad (1)$$

$$d = \frac{m\lambda}{2(n^-(2\omega) - n^+(\omega))} \quad (2)$$

where $\lambda$ is a wavelength of a fundamental wave, $n^+(2\omega)$ a refractive index of right-handed circularly polarized light in the Z-axis direction of the second harmonic, $n^+(\omega)$ a refractive index of right-handed circularly polarized light in the Z-axis direction of the fundamental wave, $n^-(2\omega)$ a refractive index of left-handed circularly polarized light in the Z-axis direction of the second harmonic, $n^-(\omega)$ a refractive index of left-handed circularly polarized light in the Z-axis direction of the fundamental wave, and m an order of QPM and natural number.

A second means for solving the above problem is the first means wherein the nonlinear optical crystal is a quartz crystal.

A third means for solving the above problem is a phase matching method of making a fundamental incident wave incident as circularly polarized light from a direction perpendicular to the polarity direction, into the wavelength conversion element being the first means or the second means, and outputting a second harmonic.

A fourth means for solving the above problem is a phase matching method wherein a fundamental incident wave is made incident from a crystal orientation where an ellipticity $\gamma$ of eigen-polarizations of a crystal is less than 0.1, into a nonlinear optical crystal having an optical rotatory power, where the ellipticity $\gamma$ is a quantity indicating a ratio of a minor axis to a major axis of an ellipse of elliptical eigen-polarizations, $\gamma=1$ represents circularly polarized light, and $\gamma=0$ represents linearly polarized light.

A fifth means for solving the above problem is a wavelength conversion element wherein in a nonlinear optical crystal having an optical rotatory power, which is a monocrystal having the positive polarity in a predetermined direction, a periodic polarity inversion structure in which the positive and negative polarities periodically alternate in a width (d) expressed by Formula (3), Formula (4), Formula (5), or Formula (6) below, is formed, and wherein a direction of incidence of incident light is a direction perpendicular to the polarity direction,

[Math 17]

$$d = \frac{m\lambda}{2(n_1(2\omega) - n_1(\omega))} \quad (3)$$

$$d = \frac{m\lambda}{2(n_1(2\omega) - n_2(\omega))} \quad (4)$$

$$d = \frac{m\lambda}{2(n_2(2\omega) - n_1(\omega))} \quad (5)$$

$$d = \frac{m\lambda}{2(n_2(2\omega) - n_2(\omega))} \quad (6)$$

where $\lambda$ is a wavelength of a fundamental wave, $n_1$ and $n_2$ refractive indices of two orthogonal eigen-polarizations in a ray direction, $n_1(2\omega)$ a refractive index of the second harmonic, $n_1(\omega)$ a refractive index of the fundamental wave, $n_2(2\omega)$ a refractive index of the second harmonic, $n_2(\omega)$ a refractive index of the fundamental wave, and m an order of QPM and natural number, and where, particularly, when the crystal is a uniaxial optical crystal, $n_1$ is an ordinary index $n_o$ and $n_2$ an extraordinary index in the ray direction.

A sixth means for solving the above problem is the fifth means wherein the nonlinear optical crystal is a quartz crystal.

A seventh means for solving the above problem is a phase matching method wherein a fundamental incident wave is made incident from a crystal orientation where an ellipticity γ of eigen-polarizations of the crystal is less than 0.1, into the wavelength conversion element being the fifth means or the sixth means.

An eighth means for solving the above problem is a phase matching method wherein incident light is made incident as elliptically polarized light into the wavelength conversion element being the fifth means or the sixth means.

A ninth means for solving the above problem is a wavelength conversion element wherein in a nonlinear optical crystal having an optical rotatory power, which is a monocrystal having the positive polarity in a predetermined direction, a periodic polarity inversion structure in which the positive and negative polarities periodically alternate in a width (d) expressed by Formula (7), Formula (8), Formula (9), or Formula (10) below, is formed, and wherein a direction of incidence of incident light is a direction perpendicular to the polarity direction,

[Math 18]

$$d = \frac{m\lambda}{2(n_{1G=0}(2\omega) - n_{1G=0}(\omega))} \quad (7)$$

$$d = \frac{m\lambda}{2(n_{1G=0}(2\omega) - n_{2G=0}(\omega))} \quad (8)$$

$$d = \frac{m\lambda}{2(n_{2G=0}(2\omega) - n_{1G=0}(\omega))} \quad (9)$$

$$d = \frac{m\lambda}{2(n_{2G=0}(2\omega) - n_{2G=0}(\omega))} \quad (10)$$

where λ is a wavelength of a fundamental wave, $n_{1G=0}$ and $n_{2G=0}$ refractive indices of two orthogonal eigen-polarizations in a crystal orientation where G=0, $n_{1G=0}(2\omega)$ a refractive index of a second harmonic, $n_{1G=0}(\omega)$ a refractive index of the fundamental wave, $n_{2G=0}(2\omega)$ a refractive index of the second harmonic, $n_{2G=0}(\omega)$ a refractive index of the fundamental wave, and m an order of QPM and natural number, where, particularly, when the crystal is a uniaxial optical crystal, $n_{1G=0}$ is an ordinary index $n_o$ and $n_{2G=0}$ an extraordinary index in the crystal orientation where G=0.

Furthermore, G is a quantity defined as follows:

[Math 19]

$$G = \sum_{i=1}^{3} \sum_{j=1}^{3} g_{ij} a_i a_j$$

where $g_{ij}$ is an ij entry in a gyration tensor of the nonlinear optical crystal of interest, and $a_i$ and $a_j$ components of a normal vector to a wavefront of the fundamental wave.

A tenth means for solving the above problem is the ninth means wherein the nonlinear optical crystal is a quartz crystal.

An eleventh means for solving the above problem is a phase matching method wherein a fundamental incident wave is made incident from a crystal orientation satisfying a condition of G=0, into the wavelength conversion element being the ninth means or the tenth means.

A twelfth means for solving the above problem is a wavelength conversion element wherein in a monocrystalline quartz crystal having the positive polarity in a predetermined direction, a periodic polarity inversion structure in which the positive and negative polarities periodically alternate in a width (d) expressed by Formula (11) or Formula (12) below, is formed and wherein a direction of incidence of incident light is a direction perpendicular to the polarity direction,

[Math 20]

$$d = \frac{m\lambda}{2(n_0(2\omega) - n_o(\omega))} \quad (11)$$

$$d = \frac{m\lambda}{2(n_\theta(2\omega) - n_o(\omega))} \quad (12)$$

where λ is a wavelength of a fundamental wave, $n_e(2\omega)$ a refractive index of an extraordinary ray of a second harmonic, $n_o(\omega)$ a refractive index of an ordinary ray of the fundamental wave, $n_o(2\omega)$ a refractive index of an ordinary ray of the second harmonic, $n_\theta(2\omega)$ a numerical value for the second harmonic expressed by the following expression where θ is an angle of inclination of a normal vector to a wavefront of the fundamental incident wave, from the c axis (or Z-axis):

[Math 21]

$$n_\theta(2\omega) = \sqrt{\frac{n_0^2(2\omega) \times n_e^2(2\omega)}{n_e(2\omega)^2 \cos^2(\theta) + n_o(2\omega)^2 \sin^2(\theta)}}$$

($n_e(2\omega)$ is the refractive index of the extraordinary ray of the second harmonic), and m an order of QPM and natural number, and where G is a quantity defined by the following expression:

[Math 22]

$$G = \sum_{i=1}^{3} \sum_{j=1}^{3} g_{ij} a_i a_j$$

where $g_{ij}$ is an ij entry in a gyration tensor of the nonlinear optical crystal of interest, and $a_i$ and $a_j$ components of the normal vector to the wavefront of the fundamental incident wave.

A thirteenth means for solving the above problem is a phase matching method wherein a fundamental incident wave is made incident from a crystal orientation satisfying a condition of G=0, into the wavelength conversion element being the twelfth means.

A fourteenth means for solving the above problem is a phase matching method wherein incident light is made incident as elliptically polarized light into a nonlinear optical crystal having an optical rotatory power.

A fifteenth means for solving the above problem is a light source device comprising a laser light source and a wavelength conversion element, in which the wavelength conversion element generates and emits a second harmonic of a laser beam emitted from the laser light source, wherein the wavelength conversion element is the wavelength conversion element being any one of the first, second, fifth, sixth, ninth, tenth, and twelfth means.

It is considered that the present invention can be better understood in view of the following description and accompanying drawings. It is, however, noted that these description and accompanying drawings are presented for illustrating the present invention but not for limiting the present invention.

Further application examples of the present invention are considered to become clear in view of the detailed description provided below. It should be, however, understood that various changes and modifications within the scope of the present invention in view of the following detailed description are obvious to those skilled in the art and that the following detailed description and embodiments are presented as preferred examples of the present invention but by way of illustration only.

BRIEF DESCRIPTION OF THE DRAWINGS

FIG. 4 is a drawing showing right-handed circularly polarized light and left-handed circularly polarized light.

FIG. 6 is a drawing showing that phases can be simultaneously matched in two vibration directions by a single periodic structure.

DESCRIPTION

Figure 1:
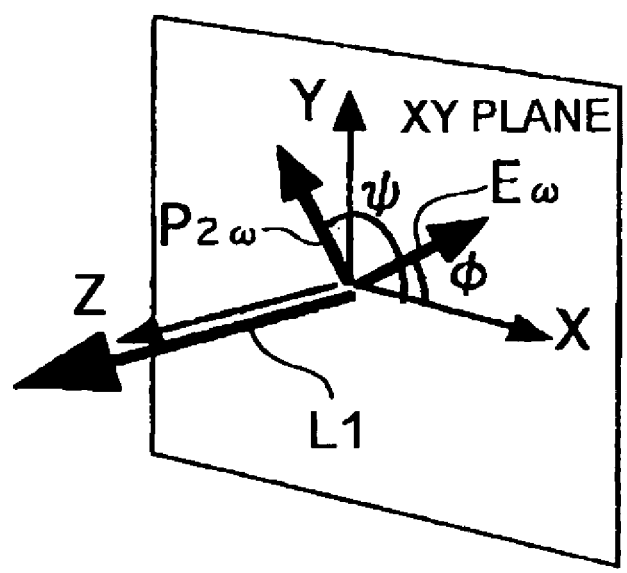
FIG. 1 is a drawing showing an electric field Eω of a fundamental wave (ω) traveling in the Z-axis direction of a quartz crystal, and a second-order nonlinear component P2ω of polarization generated thereby.

Embodiments of the present invention will be described below with reference to the drawings. It is noted that in the following description the signs and others defined in the foregoing description have the same meaning unless otherwise stated.

First Embodiment

The inventors conducted extensive and intensive research and found that phase matching of second harmonic generation in the Z-axis direction could be achieved by making a fundamental wave incident as right-handed or left-handed circularly polarized light into a quasi phase matching element using a nonlinear optical crystal belonging to point group 32 as typified by a QPM quartz crystal and a nonlinear optical crystal belonging to point group 3. In this case, the second harmonic is left-handed circularly polarized light if the fundamental wave is right-handed circularly polarized light; the second harmonic is right-handed circularly polarized light if the fundamental wave is left-handed circularly polarized light.

The theoretical background to achieve this result will be described below. Since crystals belonging to point group 32 and point group 3 have the same symmetry of their gyration tensors, they have the same crystal orientation anisotropy of appearance of their optical rotatory powers. As light, e.g., linearly polarized light propagates in the Z-axis direction in such crystals, the vibration plane rotates while the light is kept as linearly polarized light during the process of propagation. This optical rotatory behavior can be explained by considering it as a behavior of linearly polarized light which is a composite wave of two left- and right-handed circularly polarized waves different in refractive index. FIG. 4 shows right-handed circularly polarized light and left-handed circularly polarized light. FIG. 4 shows views from the Z-axis direction which is a traveling direction of light and shows movement (behavior) of the electric field vector in the XY plane at Z=0 (or in a reference plane). The light propagates in the +Z direction. The trajectory of the end of the electric field vector of the right-handed circularly polarized light draws a circle of clockwise rotation as shown in FIG. 4 (*a*); the trajectory of the end of the electric field vector of the left-handed circularly polarized light draws a circle of counterclockwise rotation as shown in FIG. 4 (*b*). Let us assume that the direction of the electric field vector at time t=0 in each circularly polarized light is the +X direction, the amplitude thereof $E_0$, the refractive index of the right-handed circularly polarized light $n^+$, and the refractive index of the left-handed circularly polarized light $n^-$. Then the right-handed circularly polarized light shown in FIG. 4 (*a*) is expressed by the following expression.

$$E_x^+(z) = E_0 \cos\{\omega t - (2\pi/\lambda) \cdot z n^+\}$$

$$E_y^+(z) = -E_0 \sin\{\omega t - (2\pi/\lambda) \cdot z n^+\} \qquad \text{[Math 23]}$$

Furthermore, the left-handed circularly polarized light shown in FIG. 4 (b) is expressed by the following expression.

$$E_x^-(z) = E_0 \cos\{\omega t - (2\pi/\lambda) \cdot zn^-\}$$

$$E_y^-(z) = E_0 \sin\{\omega t - (2\pi/\lambda) \cdot zn^-\} \quad \text{[Math 24]}$$

In these expressions, $zn^+$ represents optical path length (l)×right-handed refractive index ($n^+$), and $zn^-$ optical path length (l)×left-handed refractive index ($n^-$).

A behavior of linearly polarized light incident in the Z-axis direction into a crystal is expressed as a sum of these two circularly polarized waves as follows.

$$E_x(z) = E_x^+(z) + E_x^-(z)$$

$$E_y(z) = E_y^+(z) + E_y^-(z) \quad \text{[Math 25]}$$

Therefore, the following expression holds.

[Math 26]

$$E_x(z) = 2E_0 \cos\left\{(2\pi/\lambda) \cdot \left(\frac{n^+ - n^-}{2}\right) \cdot z\right\} \cos\left\{\omega t - (2\pi/\lambda) \cdot \left(\frac{n^+ + n^-}{2}\right) \cdot z\right\}$$

$$E_y(z) = 2E_0 \sin\left\{(2\pi/\lambda) \cdot \left(\frac{n^+ - n^-}{2}\right) \cdot z\right\} \cos\left\{\omega t - (2\pi/\lambda) \cdot \left(\frac{n^+ + n^-}{2}\right) \cdot z\right\}$$

Let us define rotatory power $\rho$ and mean refractive index n as follows.

[Math 27]

$$\rho \equiv (2\pi/\lambda) \cdot \left(\frac{n^+ - n^-}{2}\right)$$

$$n \equiv \left(\frac{n^+ + n^-}{2}\right)$$

Then, we can express the linearly polarized light propagating in the Z-axis direction in the crystal, as follows.

$$E_x(z) = 2E_0 \cos\{\rho \cdot z\} \cos\{\omega t - (2\pi/\lambda) \cdot n \cdot z\}$$

$$E_y(z) = 2E_0 \sin\{\rho \cdot z\} \cos\{\omega t - (2\pi/\lambda) \cdot n \cdot z\} \quad \text{[Math 28]}$$

Figure 5:
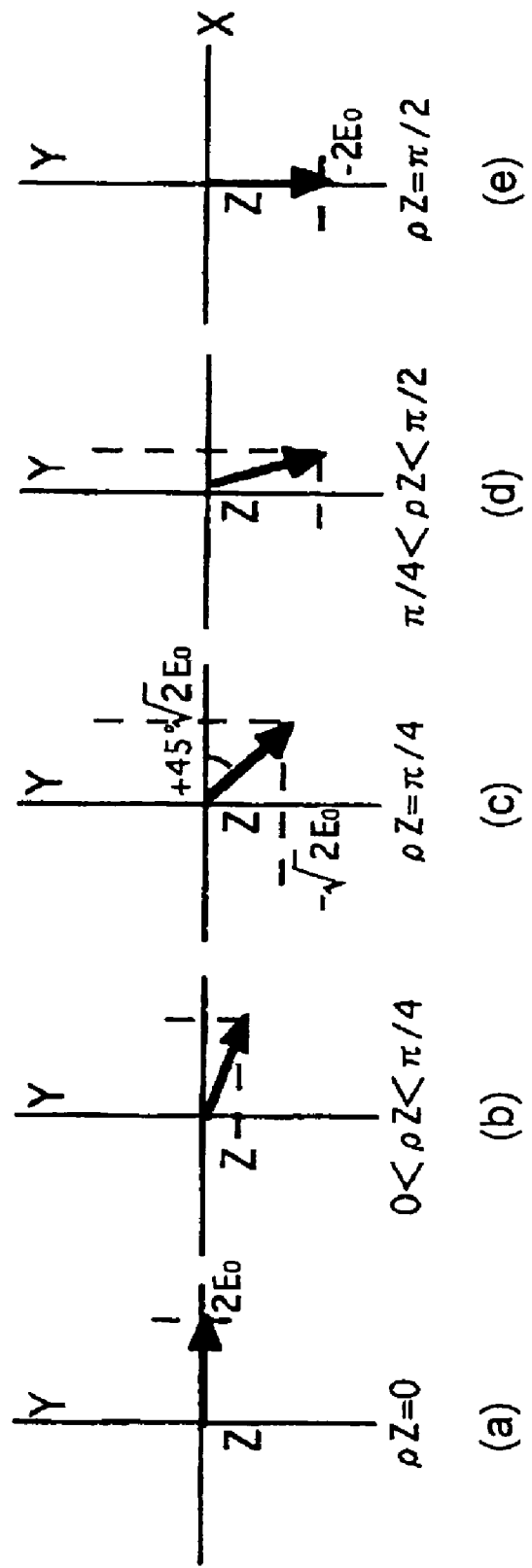
FIG. 5 is a drawing showing apparent rotation of linearly polarized light propagating in the Z-axis direction.

Since at Z=0 the Ey component is 0, it can be considered as linearly polarized light with the amplitude of $2E_0$ vibrating in the X-axis direction. In the case of $\rho$<0, however, the Ey component increases in a sin curve while the Ex component decreases in a cos curve, with increase in Z or with travel of light in the propagation direction, as shown in FIG. 5; therefore, the vibration plane appears as if it rotates clockwise from the X-axis while the light remains as a linearly polarized wave. Namely, the linearly polarized light propagating in the Z-axis direction cannot maintain its state and shows such a behavior that the vibration plane rotates clockwise while it still remains as a linearly polarized wave with propagation (FIG. 5). In FIG. 5, the light propagates in the +Z direction. FIG. 5 shows the behavior of the electric field vector on the reference plane in the case of $\rho$<0 (clockwise rotation). Specifically, FIG. 5 (a) shows the case of $\rho Z$=0, FIG. 5 (b) the case of 0<$\rho Z$<$\pi$/4, FIG. 5 (c) the case of $\rho Z$=$\pi$/4, FIG. 5 (d) the case of $\pi$/4<$\rho Z$<$\pi$/2, and FIG. 5 (e) the case of $\rho Z$=$\pi$/2, respectively.

In the case of $\rho Z$=0, as shown in FIG. 5 (a), the X component of the electric field vector is $2E_0$ and the Y component is 0. In the case of $\rho Z$=$\pi$/4, as shown in FIG. 5 (c), the X component of the electric field vector is $\sqrt{2} E_0$ and the Y component $-\sqrt{2} E_0$. In the case of $\rho Z$=$\pi$/2, as shown in FIG. 5 (e), the X component of the electric field vector is 0 and the Y component $-2E_0$.

In the process of considering this phenomenon in detail, the inventors focused attention on a certain fact. If light propagating in a crystal is circularly polarized light in view of the above equation, it will be dominated by only either one refractive index, $n^+$ or $n^-$; then we focused attention on the fact that the polarization state of the light is preserved during the process of propagation in the Z-axis direction in the crystal. We further focused attention on the fact that the state of circularly polarized light can be expressed as a set of linearly polarized waves with the phase difference of $\pi$/2 having the same refractive index and amplitude and being perpendicular to each other.

Namely, phase matching can be achieved even with optical rotatory power if the following conditions are satisfied: the incident fundamental wave is circularly polarized light and the second harmonic generated therefrom is also circularly polarized light. This is because the phase of the second harmonic can be matched only when the following two conditions are satisfied: the state of the fundamental wave is preserved whereby the condition for second harmonic generation is preserved; the state of the second harmonic itself generated therefrom is preserved. In this case, then, the linearly polarized light state is preserved in two orthogonal vibration directions and the conventional idea of phase matching can be introduced.

In addition, since phase shift of second harmonics generated in the two vibration directions is uniquely determined by an index difference between incident circularly polarized light and circularly polarized light of the second harmonic, the phase can be matched simultaneously in the two vibration directions by a single periodic structure. In terms of whether or not this becomes feasible, the symmetry of the tensor of nonlinear optical constants in a nonlinear optical crystal of interest becomes greatly significant.

After intensive and extensive research, the inventors found that these conditions could be met by quartz crystal. The theoretical background thereof will be described with reference to FIG. 6, using an example where the fundamental wave is incident in the form of left-handed circularly polarized light. Supposing the fundamental wave is left-handed circularly polarized light with the amplitude $E_0$ and the refractive index $n^-$ traveling in the Z-axis direction, as shown in FIG. 6 (a), it is described as polarized light having components of X-directional linearly polarized light and Y-directional linearly polarized light in a relation of the phase difference of $\pi$/2 as follows.

$$E_x^\omega(z) = E_0 \cos\{\omega t - (2\pi/\lambda) \cdot zn^-(\omega)\}$$

$$E_y^\omega(z) = E_0 \sin\{\omega t - (2\pi/\lambda) \cdot zn^-(\omega)\} \quad \text{[Math 29]}$$

Furthermore, the tensor of nonlinear optical constants in point group 32 to which the quartz crystal belongs is described as follows from the symmetry of the crystal.

[Math 30]

$$\begin{pmatrix} d_{11} & -d_{11} & 0 & 0 & 0 & 0 \\ 0 & 0 & 0 & 0 & 0 & -d_{11} \\ 0 & 0 & 0 & 0 & 0 & 0 \end{pmatrix}$$

Therefore, the nonlinear polarization P2$\omega$ as a basis of second harmonic generation is given by the following expression.

[Math 31]

$$\begin{pmatrix} P_1^{2\omega}(z) \\ P_2^{2\omega}(z) \\ P_3^{2\omega}(z) \end{pmatrix} = \varepsilon_0 \begin{pmatrix} d_{11} & -d_{11} & 0 & 0 & 0 & 0 \\ 0 & 0 & 0 & 0 & 0 & -d_{11} \\ 0 & 0 & 0 & 0 & 0 & 0 \end{pmatrix}$$

$$\begin{pmatrix} E_0^2(1/2)\cos\{2\omega t - 2(2\pi/\lambda) \cdot zn^-(\omega)\} \\ -E_0^2(1/2)\cos\{2\omega t - 2(2\pi/\lambda) \cdot zn^-(\omega)\} \\ 0 \\ 0 \\ 0 \\ 2E_0^2(1/2)\sin\{2\omega t - 2(2\pi/\lambda) \cdot zn^-(\omega)\} \end{pmatrix}$$

$$= \varepsilon_0 d_{11} E_0^2 \begin{pmatrix} \cos\{2\omega t - 2(2\pi/\lambda) \cdot zn^-(\omega)\} \\ -\sin\{2\omega t - 2(2\pi/\lambda) \cdot zn^-(\omega)\} \\ 0 \end{pmatrix}$$

Therefore, we can obtain the following expression.

$P_x^{2\omega}(z) = \varepsilon_0 d_{11} E_0^2 \cos\{2\omega t - 2(2\pi/\lambda) \cdot zn^-(\omega)\}$ $P_y^{2\omega}(z) = -\varepsilon_0 d_{11} E_0^2 \sin\{2\omega t - 2(2\pi/\lambda) \cdot zn^-(\omega)\}$ [Math 32]

Figure 7:
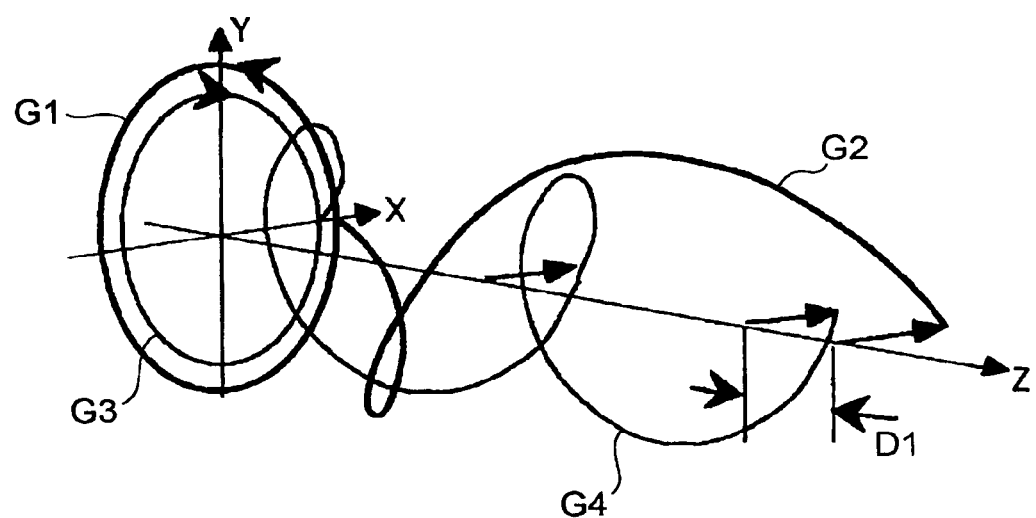
FIG. 7 is a drawing showing a state in which clockwise rotation of P2ω is caused from a fundamental wave of left-handed circularly polarized light, to generate a second harmonic of right-handed circularly polarized light.

When these are depicted in a drawing, as shown in FIG. 6 (b), it is seen that the behavior of P2ω in the XY plane at Z=0 (reference plane) is such that a vector with the constant magnitude ($\varepsilon_0 d_{11} E_0^2$) rotates clockwise. Namely, the polarization (2ω) executes a circular motion of clockwise rotation at a double rate. Namely, incidence of left-handed circularly polarized light of the fundamental wave into the quartz crystal belonging to point group 32 causes clockwise rotation of P2ω, as shown in FIG. 7, and the second harmonic of right-handed circularly polarized light is generated therefrom. FIG. 7 shows that clockwise rotation of P2ω is generated from the fundamental wave of left-handed circularly polarized light and shows the behavior of the second harmonic of right-handed circularly polarized light generated. Graph G1 in FIG. 7 shows the behavior in the reference plane of the incident fundamental wave of left-handed circularly polarized light, graph G2 the behavior of the incident fundamental wave of left-handed circularly polarized light, graph G3 the behavior in the reference plane of the second harmonic (right-handed circularly polarized light) generated from rotation of the polarization (2ω) in the reference plane, and graph G4 the behavior of the second harmonic (right-handed circularly polarized light) generated from rotation of the polarization (2ω) in the reference plane.

At this time, it is seen from the expression that the fundamental wave of left-handed circularly polarized light is dominated by only the refractive index n⁻(ω) and propagates in the crystal while the state of polarization is preserved, and similarly that the nonlinear polarization P2ω caused as a consequence thereof also has a periodic structure dominated by the refractive index n⁻(ω). However, since the second harmonic itself generated from the polarization P2ω is right-handed circularly polarized light of the frequency 2ω, it is dominated by the refractive index n⁺(2ω) different from the refractive index n⁻(ω) of the fundamental wave and is pure right-handed circularly polarized light containing no left-handed circular polarization component; therefore, it propagates in the crystal while the state of polarization is preserved. Consequently, the second harmonic of the refractive index n⁺(2ω) generated at the timing of the refractive index n⁻(ω) of the fundamental wave comes to have the phase shifted at a fixed rate with propagation (phase difference D1). This is the same as the phase difference which becomes a problem in ordinary phase matching of linearly polarized light. In a crystal without optical rotatory power, the phase difference is uniquely determined by an index difference between refractive indices of linearly polarized waves whose state is preserved, whereas the quartz crystal with optical rotatory power has such a property that the phase difference is uniquely determined in the form of an index difference between circularly polarized waves whose state is preserved, which we found.

Figure 8:
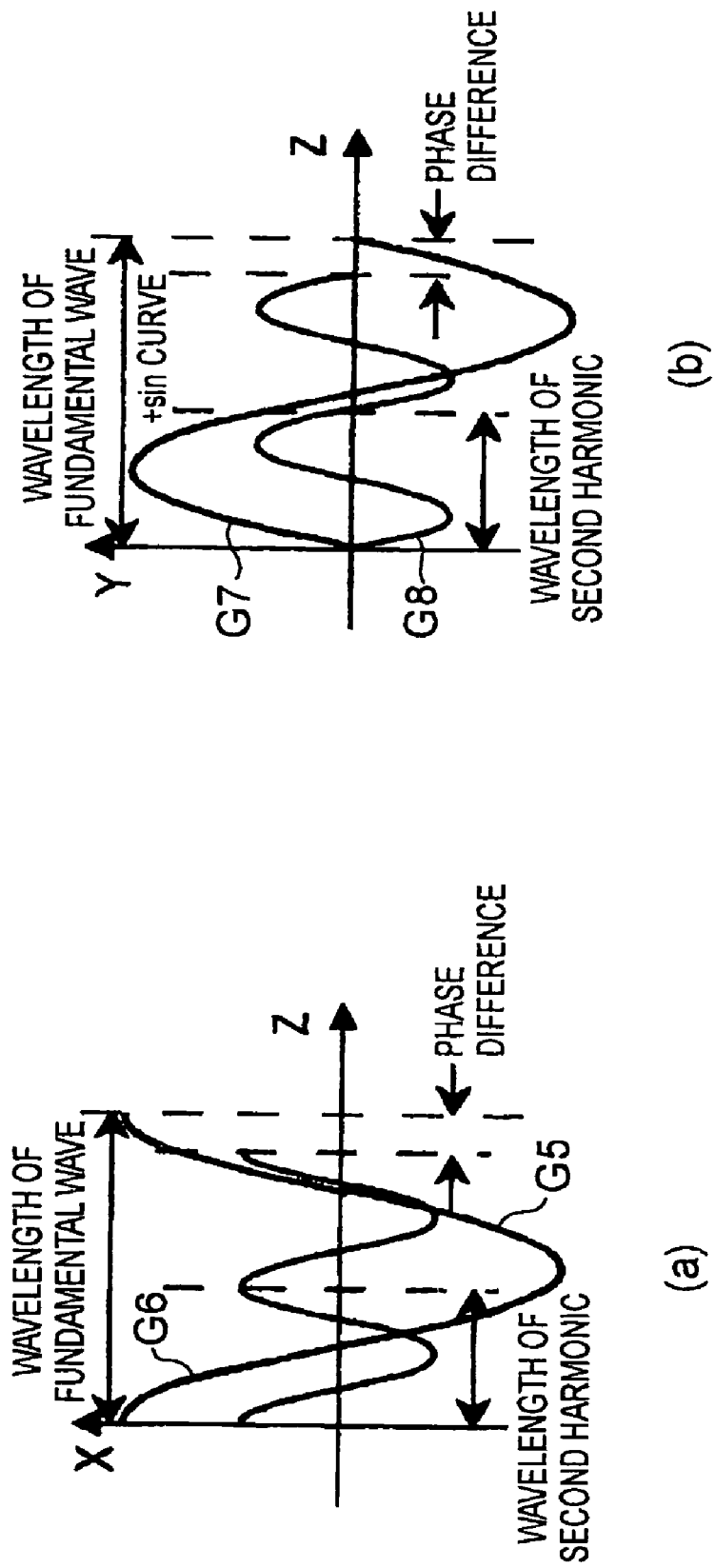
FIG. 8 is a drawing showing respective views of X components and Y components shown in FIG. 7.

FIG. 8 shows views of respective components of the X components and the Y components shown in FIG. 7. FIG. 8 (a) shows the X-directional vibration components and FIG. 8 (b) the Y-directional vibration components. Graph G5 in FIG. 8 (a) represents the X-directional vibration component of the fundamental wave and graph G6 the X-directional vibration component of the second harmonic. Graph G7 in FIG. 8 (b) represents the Y-directional vibration component of the fundamental wave and graph G8 the Y-directional vibration component of the second harmonic. The X component of the fundamental wave shown in FIG. 8 (a) is expressed by the following expression.

[Math 33]

$$E_x^{\omega}(z) = E_0 \cos\left\{\omega t - 2\left(\frac{\pi}{\lambda}\right) \cdot zn^-(\omega)\right\}$$

The X component of the second harmonic shown in FIG. 8 (a) is expressed by the following expression.

[Math 34]

$$E_x^{2\omega}(z) \propto \varepsilon_0 d_{11} E_0^2 \cos\left\{2\omega t - 2\left(\frac{2\pi}{\lambda}\right) \cdot zn^+(2\omega)\right\}$$

The Y component of the fundamental wave shown in FIG. 8 (b) is expressed by the following expression.

[Math 35]

$$E_y^{\omega}(z) = E_0 \sin\left\{\omega t - 2\left(\frac{\pi}{\lambda}\right) \cdot zn^-(\omega)\right\}$$

The Y component of the second harmonic shown in FIG. 8 (b) is expressed by the following expression.

[Math 36]

$$E_y^{2\omega}(z) \propto -\varepsilon_0 d_{11} E_0^2 \sin\left\{2\omega t - 2\left(\frac{2\pi}{\lambda}\right) \cdot zn^+(2\omega)\right\}$$

Namely, graph G5 describes a +cos curve, graph G6 a +cos curve, graph G7 a +sin curve, and graph G8 a −sin curve, respectively. In FIG. 8 (a), a Z-directional length corresponding to a cycle 2π of graph G5 is equivalent to the wavelength of the fundamental wave and a Z-directional length corresponding to a cycle 2π of graph G6 is equivalent to the wavelength of the second harmonic. In FIG. 8 (b), a Z-directional length corresponding to a cycle 2π of graph G7 is equivalent to the wavelength of the fundamental wave and a Z-directional length corresponding to a cycle 2π of graph G8 is equivalent to the wavelength of the second harmonic. In FIG. 8 (a), the phase difference between the second harmonic and the fundamental wave is expressed by a difference between a Z-directional position at a cycle of the fundamental wave (G5) and a Z-directional position at two cycles of the second harmonic (G6) from the state of phase 0 of graphs G5 and G6. In FIG. 8 (b), the phase difference between the second harmonic and the fundamental wave is expressed by a difference between a Z-directional position at a cycle of the fundamental wave (G7) and a Z-directional position at two cycles of the second harmonic (G8) from the state of phase 0 of graphs G7 and G8.

Since circularly polarized light is a composition of orthogonal linearly polarized waves with the phase difference of $\pi/2$, the fundamental wave and the second harmonic both should have the Y component of a sin curve if the X component is assumed to be a cos curve. It is, however, noted that the fundamental wave of left-handed circularly polarized light has the Y component of the +sin curve whereas the second harmonic of right-handed circularly polarized light has the Y component of the −sin curve. On this occasion, it is necessary to pay attention to the fact that the phase differences between the second harmonic and the fundamental wave, or the phase differences between second harmonics generated at the timing of the fundamental wave, i.e., those between their X components and between their Y components, both are dominated by an index difference between a set of refractive indices, the difference between $n^+(2\omega)$ and $n^-(\omega)$. It is further important herein that the state of circularly polarized light as a basis of each component be preserved during the process of propagation in the crystal and, as a result, that linearly polarized light of each of these X and Y components as components thereof be also preserved while keeping the aforementioned relationship. Therefore, if a QPM periodic structure based on the index difference between a set of refractive indices of $n^+(2\omega)$ and $n^-(\omega)$ is constructed, the conventional concept of phase matching by linearly polarized light will be applicable to each of the X and Y components and it will become feasible to achieve second harmonic generation.

The above tells us that when the QPM periodic structure based on the index difference between $n^+(2\omega)$ and $n^-(\omega)$ is constructed in the Z-axis direction of the quartz crystal with optical rotatory power and when the fundamental wave of left-handed circularly polarized light is made incident thereinto, the phase matching of the second harmonic of right-handed circularly polarized light can be achieved. Similarly, the phase matching of the second harmonic of left-handed circularly polarized light can also be achieved when the QPM periodic structure based on the index difference between $n^-(2\omega)$ and $n^+(\omega)$ is constructed and when the fundamental wave of right-handed circularly polarized light is made incident thereinto. Behind the existence of this finding, the aforementioned symmetry of tensor components of nonlinear optical constants of point group 32 plays a critical role.

Therefore, the above discussion does not apply only to the quartz crystal, but also applies to all the crystals belonging to the same point group 32 as the quartz crystal.

Figure 9:
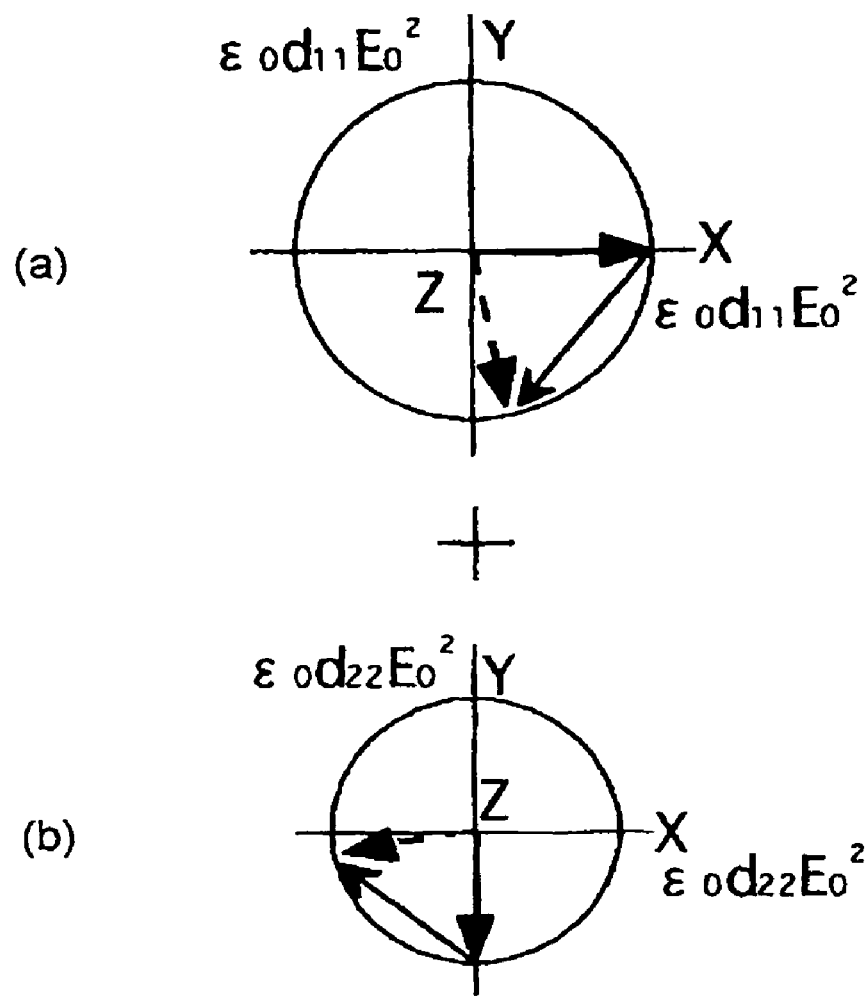
FIG. 9 is a drawing for explaining that the same circular polarization phase matching can also be achieved in a crystal belonging to point group 3.

The same phase matching of circularly polarized light can also be achieved in crystals belonging to point group 3, which will be described below. The below will describe the theoretical background, also using an example where the fundamental wave is made incident in the form of left-handed circularly polarized light as shown in FIG. 9. When the fundamental wave is assumed to be left-handed circularly polarized light with the amplitude $E_0$ and the refractive index $n^-$ traveling in the Z-axis direction, it is described as polarized light having components of X-directional linearly polarized wave and Y-directional linearly polarized wave in the relation of the phase difference of $\pi/2$ as follows.

[Math 37]

$$E_x^\omega(z) = E_0 \cos\{\omega t - (2\pi/\lambda) \cdot z n^-(\omega)\}$$
$$E_y^\omega(z) = E_0 \sin\{\omega t - (2\pi/\lambda) \cdot z n^-(\omega)\}$$

Furthermore, the tensor of nonlinear optical constants in point group 3 is described as follows from its symmetry.

[Math 38]

$$\begin{pmatrix} d_{11} & -d_{11} & 0 & 0 & d_{31} & -d_{22} \\ -d_{22} & d_{22} & 0 & d_{31} & 0 & -d_{11} \\ d_{31} & d_{31} & d_{33} & 0 & 0 & 0 \end{pmatrix}$$

Therefore, the nonlinear polarization $P2\omega$ as a basis of second harmonic generation is given as follows.

[Math 39]

$$\begin{pmatrix} P_1^{2\omega}(z) \\ P_2^{2\omega}(z) \\ P_3^{2\omega}(z) \end{pmatrix} = \varepsilon_0 \begin{pmatrix} d_{11} & -d_{11} & 0 & 0 & d_{31} & -d_{22} \\ -d_{22} & d_{22} & 0 & d_{31} & 0 & -d_{11} \\ d_{31} & d_{31} & d_{33} & 0 & 0 & 0 \end{pmatrix}$$

$$\begin{pmatrix} E_0^2(1/2)\cos\{2\omega t - 2(2\pi/\lambda) \cdot z n^-(\omega)\} \\ -E_0^2(1/2)\cos\{2\omega t - 2(2\pi/\lambda) \cdot z n^-(\omega)\} \\ 0 \\ 0 \\ 0 \\ 2E_0^2(1/2)\sin\{2\omega t - 2(2\pi/\lambda) \cdot z n^-(\omega)\} \end{pmatrix}$$

$$= \varepsilon_0 E_0^2 \begin{pmatrix} d_{11}\cos\{2\omega t - 2(2\pi/\lambda) \cdot z n^-(\omega)\} - \\ d_{22}\sin\{2\omega t - 2(2\pi/\lambda) \cdot z n^-(\omega)\} \\ -d_{11}\sin\{2\omega t - 2(2\pi/\lambda) \cdot z n^-(\omega)\} - \\ d_{22}\cos\{2\omega t - 2(2\pi/\lambda) \cdot z n^-(\omega)\} \\ 0 \end{pmatrix}$$

Hence we obtain the following.

$$P_x^{2\omega}(z) = \varepsilon_0 E_0^2 [d_{11} \cos\{2\omega t - 2(2\pi/\lambda) \cdot z n^-(\omega)\} - d_{22} \sin\{2\omega t - 2(2\pi/\lambda) \cdot z n^-(\omega)\}]$$

$$P_y^{2\omega}(z) = \varepsilon_0 E_0^2 [-d_{11} \sin\{2\omega t - 2(2\pi/\lambda) \cdot z n^-(\omega)\} - d_{22} \cos\{2\omega t - 2(2\pi/\lambda) \cdot z n^-(\omega)\}] \qquad \text{[Math 40]}$$

The above expression is obtained as a sum of the following nonlinear polarization $P2\omega$ with focus on the $d_{11}$ component shown in FIG. 9 (a);

[Math 41]

$$P_x^{2\omega}(z) = \varepsilon_0 d_{11} E_0^2 \cos\left\{2\omega t - 2\left(\frac{2\pi}{\lambda}\right) \cdot z n^-(\omega)\right\}$$

$$P_y^{2\omega}(z) = -\varepsilon_0 d_{11} E_0^2 \sin\left\{2\omega t - 2\left(\frac{2\pi}{\lambda}\right) \cdot z n^-(\omega)\right\};$$

and the following nonlinear polarization $P2\omega$ with focus on the $d_{22}$ component shown in FIG. 9 (b).

[Math 42]

$$P_x^{2\varpi}(z) = -\varepsilon_0 d_{22} E_0^2 \sin\left\{2\omega t - 2\left(\frac{2\pi}{\lambda}\right) \cdot z n^-(\omega)\right\}$$

$$P_y^{2\varpi}(z) = -\varepsilon_0 d_{22} E_0^2 \cos\left\{2\omega t - 2\left(\frac{2\pi}{\lambda}\right) \cdot z n^-(\omega)\right\}$$

When attention is focused on the $d_{11}$ component only, the behavior of P2ω in the XY plane at Z=0 is a clockwise rotation motion of a vector with the constant magnitude ($\varepsilon_0 d_{11} E_0^2$); when attention is focused on the other $d_{22}$ component, it is a clockwise rotation motion of a vector with the magnitude $\varepsilon_0 d_{22} E_0^2$. There is a phase difference of π/2 between them and the overall behavior is a composition of these two types of clockwise rotations. FIG. 9 (a) shows the nonlinear polarization P2ω with focus on the $d_{11}$ component and FIG. 9 (b) the nonlinear polarization P2ω with focus on the $d_{22}$ component. The radius of the circle in FIG. 9 (a) is $\varepsilon_0 d_{11} E_0^2$ and the radius of the circle in FIG. 9 (b) $\varepsilon_0 d_{22} E_0^2$. Therefore, the nonlinear polarization P2ω with focus on the $d_{11}$ component shown in FIG. 9 (a) and the nonlinear polarization P2ω with focus on the $d_{22}$ component shown in FIG. 9 (b) are expressed by the aforementioned expressions.

Specific behaviors are dependent on values of $d_{11}$ and $d_{22}$, but they constantly remain as clockwise rotation motions. Namely, incidence of left-handed circularly polarized light of the fundamental wave into a crystal belonging to point group 3 causes clockwise rotation of P2ω and the second harmonic of right-handed circularly polarized light is generated therefrom.

The further theory from this point is the same as in the case of point group 32. The fundamental wave of left-handed circularly polarized light is dominated by only the refractive index $n^-(\omega)$ and propagates in the crystal while the state of polarization is preserved; similarly, the nonlinear polarization P2ω generated as a consequence thereof also has a periodic structure dominated by the refractive index $n^-(\omega)$, which is seen from the expressions. However, since the second harmonic itself generated from the polarization P2ω is right-handed circularly polarized light of the frequency 2ω, it is dominated by the refractive index $n^+(2\omega)$ different from the refractive index $n^-(\omega)$ of the fundamental wave and is pure right-handed circularly polarized light containing no left-handed circular polarization component, and therefore it propagates in the crystal while the state of polarization is preserved. Consequently, the second harmonic with the refractive index $n^+(2\omega)$ generated at the timing of the refractive index $n^-(\omega)$ of the fundamental wave comes to have the phase shifted at a fixed rate with propagation. This is the same as the phase difference which becomes a problem in ordinary phase matching of linearly polarized light.

Circularly polarized light is a composition of orthogonal linearly polarized waves with the phase difference of π/2. On this occasion, in each of the linearly polarized light components, the phase differences between the second harmonic and the fundamental wave, or the phase differences between second harmonics generated at the timing of the fundamental wave, i.e., those between their X components and between their Y components, both are dominated by an index difference between a set of refractive indices, the difference between $n^+(2\omega)$ and $n^-(\omega)$. Since the state of circularly polarized light as a basis is preserved during the process of propagation in the crystal, linearly polarized light of each of the X and Y components as components thereof is also preserved while keeping the aforementioned relationship. Therefore, when a QPM periodic structure is constructed based on the index difference between the set of refractive indices $n^+(2\omega)$ and $n^-(\omega)$, the conventional concept of phase matching by linearly polarized light applies to each of the X and Y components and it becomes feasible to achieve second harmonic generation.

As seen from the above, when the QPM periodic structure based on the index difference between $n^+(2\omega)$ and $n^-(\omega)$ is constructed in the Z-axis direction of the crystal in point group 3 with optical rotatory power and when the fundamental wave of left-handed circularly polarized light is made incident thereinto, it becomes feasible to achieve phase matching of the second harmonic of right-handed circularly polarized light. Similarly, the phase matching of the second harmonic by left-handed circularly polarized light can also be achieved when the QPM periodic structure is constructed based on the index difference between $n^-(2\omega)$ and $n^+(\omega)$ and when the fundamental wave of right-handed circularly polarized light is made incident thereinto.

Namely, the second harmonic can be efficiently generated when a periodic polarity inversion structure is constructed so that the positive and negative polarities periodically alternate in the Z-axis direction in a period substantially identical to d expressed by aforementioned Formula (1) or Formula (2) and when the incident fundamental wave is made incident as circularly polarized light from a direction substantially perpendicular to a polarity direction.

Such nonlinear optical crystals are widely applied to light sources for lithography in the material processing to semiconductor fields and further applied in the material surface modification and medical fields. They are also suitably applicable to demands for short-wavelength laser beams in the ultraviolet to vacuum ultraviolet region where expectations of further application are recently increasing. Namely, the majority of short-wavelength laser light sources presently in use are excimer lasers which are gas lasers using rare gas-halide. However, the excimer lasers have various disadvantages; for example, they require large-scale equipment, attention is needed for handling because of use of the halide-based gas, they require time and labor for maintenance because of early deterioration of characteristics and short lifetime, and running cost is extremely high.

In contrast to it, solid-state lasers using crystals or semiconductors have advantages of permitting compact scale, being safe, and requiring less maintenance, but it is extremely difficult to generate a short wavelength, because a generated wave is in a long wavelength range centered on infrared. There is no solid-state laser at a practical use level, particularly, in generation in the vacuum ultraviolet region.

As a method for avoiding the disadvantages of the excimer lasers, it is recently common practice to use a method of converting a wavelength of a solid-state laser to a shorter wavelength by making use of the nonlinear optical crystal. The nonlinear optical effect is an effect by nonlinearity of polarization response of material and is a phenomenon in which when strong light like a laser beam is made incident into a material, the response of polarization becomes unproportional to the electric field of the incident light whereby part of the incident light is subjected to wavelength conversion. Particularly, the second harmonic generation (SHG) to extract light of half the wavelength of the incident light by making use of the second-order nonlinear optical effect is most common as a wavelength conversion method of the laser beam into a shorter wavelength, has a high conversion efficiency, and is also realized in a relatively simple configuration. For example, a way of use thereof is such that the wavelength of 1064 nm of a Nd:YAG laser is converted into a half wavelength, 532 nm, by use of a nonlinear optical crystal and it is further converted into a quarter wavelength of 266 nm using another nonlinear optical crystal.

However, this method also has limits and to what extent the conversion is possible is restricted by material characteristics of the nonlinear optical material of interest. At how short wavelength the second harmonic is generated, i.e., the shortest SHG wavelength is determined by the absorption edge wavelength of the material and capability of phase matching. The absorption edge wavelength determines the shortest wavelength of light that can be transmitted by the material and it is impossible to generate a second harmonic at a wavelength shorter than it because the whole light to be generated is absorbed. However, even if the wavelength of the second harmonic is not less than the absorption edge wavelength, the second harmonic generation is not achieved in the nonlinear optical material unless the phase of the second harmonic is aligned, i.e., unless the phase matching is achieved.

Incidentally, every solid material has dispersion of refractive index and the refractive index in a solid differs depending upon wavelengths. There is such a general tendency that the refractive index increases with decrease in wavelength, particularly, on the short wavelength side. Now, the second harmonic generation in the nonlinear optical crystals is, precisely, to generate light of a frequency equal to double that of incident light (fundamental wave). This is exactly equivalent to generation of light of a half wavelength in vacuum. However, since there is dispersion in the nonlinear optical crystal where the wavelength conversion is effected, there occurs a situation where the wavelength of the second harmonic in the crystal is not accurately half of the wavelength of incident light (fundamental wave) in the crystal. For example, in the case of an ordinary material whose refractive index increases with decrease in wavelength, the wavelength of the second harmonic in the crystal becomes a little shorter than half of the wavelength of the incident light.

In the nonlinear optical crystal, the second harmonic is continually generated with travel of the fundamental wave in the crystal and the timing of generation thereof is dominated by the phase of the incident light in the crystal. If the wavelength of the second harmonic generated is precisely half of the wavelength of the incident light, phases of second harmonics generated continually will become accurately coincident with each other. Satisfaction of this condition is called phase matching. However, the second harmonic actually generated has the wavelength a little shorter than half of the wavelength of the incident light because of the dispersion. For this reason, the phases of second harmonics become gradually shifted from each other. In this case, when the phase difference between two second harmonics becomes $\pi$, cancellation thereof starts, so as to fail to generate the second harmonic in a satisfactory light quantity. This is a state in which the phase matching condition is not met.

Birefringence of crystal is usually used for achieving phase matching. The birefringence is a phenomenon in which with light waves propagating in the crystal, the refractive index differs depending upon the crystal orientation along which the vibration plane of the electric field is directed, even if the light waves travel in the same traveling direction. Then, by selecting the crystal orientation for the electric field vibration plane through use of polarized light, it becomes feasible to provide one wavelength with a certain width for the magnitude of available refractive index (this width corresponds to the degree of birefringence). If this property is suitably utilized to find a condition that the wavelength of the second harmonic in the crystal becomes exactly equal to half of the wavelength of the fundamental wave, the phase matching can be achieved and the second harmonic generation can be realized. In practical use of the nonlinear optical crystal, the wavelength conversion is implemented by finding the crystal orientation to satisfy this condition and making the fundamental wave incident in that direction.

However, the property of dispersion generally tends to increase as the wavelength becomes shorter toward the absorption edge wavelength; therefore, the degree of birefringence necessary for phase matching becomes greater with decrease in the wavelength of the second harmonic to be desired, and will exceed the maximum birefringence of the crystal eventually. Consequently, the shortest wavelength (shortest SHG wavelength) to enable the phase matching of second harmonic generation depends upon birefringence characteristics of the nonlinear optical crystal and a crystal with a small birefringence can generate the second harmonic only to a wavelength much longer than the absorption edge wavelength thereof.

A method of quasi phase matching is proposed as a method to solve this problem of phase matching of the nonlinear optical crystal and is now brought into practical use with some crystals. This is application of the property that the phase of light generated in second harmonic generation is determined by a polarity direction of a crystal. It was described above that the phases of second harmonics became gradually shifted from each other unless the phase matching condition was not met, and the second harmonics start canceling each other after the phase shift relative to the first generated second harmonic becomes $\pi$. Therefore, if the phase of the second harmonic can be inverted (or shifted by $\pi$) at the timing of the start of this mutual cancellation, the cancellation between second harmonics can be avoided. Namely, it is effective to construct such a structure that the polarity direction of crystal is inverted at this timing. When the structure is such that the polarity direction is again inverted at a start of next cancellation, the second harmonic can further travel without cancellation in the crystal. In order to realize it persistently, it is effective to construct a periodic polarity inversion structure in consideration of the distance for the second harmonics to start canceling each other, in the nonlinear optical crystal. The method of enabling the second harmonic generation while avoiding the cancellation between second harmonics as described above is the quasi phase matching.

The method of quasi phase matching has various advantages over the ordinary phase matching using birefringence. First, the second harmonic generation can be implemented down to the absorption edge wavelength of a material in use by shortening the periodic structure. This permits us to avoid the problem in the phase matching by birefringence. Furthermore, the quasi phase matching is equivalent to satisfying the condition of "noncritical phase matching" in the phase matching using birefringence, and thus has the following advantages. First, the phase matching condition loosens so as to enable wavelength conversion with extremely high stability in practical use and with extremely high resistance to variation in temperature and physical deviation of element. Since there occurs no deviation (walk-off) in the traveling direction between the fundamental wave and the second harmonic due to birefringence, the beam profile can be prevented from being deformed with wavelength conversion. Since there is no walk-off, the conversion efficiency can be readily improved by increasing the element length.

The structure in which the polarity of crystal is periodically inverted is needed for realizing the quasi phase matching, and it is presently implemented by such methods as a method of bonding thin polished crystals and a method of making polarity-inverted domains inside a single crystal. For generating a short wavelength such as ultraviolet light, it is necessary to form a fine periodic structure and it is thus common practice to employ the latter method of forming polarity-inverted domains; however, it is the present status that this method is the technology that can be applied to some crystals only. Most of such materials are ferroelectrics whose spontaneous polarization can be inverted by applying an external electric field thereto, and principal materials thereof include lithium niobate, tantalum niobate, and so on. However, lithium niobate and tantalum niobate of ferroelectrics have the absorption edge wavelength of about 300 nm at the shortest, and it is thus infeasible to generate the second harmonic at lower wavelengths than it, particularly, at 200 nm or less called the vacuum ultraviolet region. Until quite recently, therefore, the quasi phase matching has been realized only with the use of ferroelectrics, and it was impossible to realize the second harmonic generation at 200 nm or less even by the quasi phase matching technology.

Recently, a quasi phase matching element using a quartz crystal (which will be sometimes referred to as a QPM quartz crystal) is drawing attention as a wavelength conversion element that enables the second harmonic generation in the vacuum ultraviolet wavelength region of not more than 200 nm. Since the QPM quartz crystal is a nonlinear optical crystal having the absorption edge wavelength of not more than 150 nm, it is expected as an element that can generate the second harmonic of not more than 200 nm by quasi phase matching, and, particularly, that can generate the second harmonic of 193 nm corresponding to the ArF excimer laser wavelength or the second harmonic of 157 nm corresponding to the $F_2$ excimer laser wavelength. However, the quartz crystal is not a ferroelectric, and thus the conventional polarization inversion with application of the electric field is not available for manufacture of a quasi phase matching element having a periodic polarity inversion structure. For this reason, an element is manufactured by making use of the property peculiar to the quartz crystal, i.e., formation of Dauphine twins by application of stress.

In the quasi phase matching element of quartz crystal, the periodic structure is formed toward the Z-axis direction because of restrictions of the crystal for formation of twins in the QPM quartz crystal. In other words, the domains in the mutually polarity inversion relation must be arranged by a way of arrangement in which they are stacked in the Z-axis direction with their boundary faces are planes normal to the Z-axis ({0001} planes). In the case of the phase matching in the QPM quartz crystal, the key is phase matching in the Z-axis direction, i.e., incidence of the fundamental wave from the Z-axis direction and the second harmonic generation in the Z-axis direction.

However, the phase matching with quartz crystal raises a problem that has never been encountered in the conventional phase matching. It is caused by a crystal-optic phenomenon, called optical rotatory power, and the optical rotatory power is an outstanding phenomenon, particularly, in the Z-axis direction of the quartz crystal. The optical rotatory phenomenon appears, for example, in such a manner that linearly polarized light traveling in the crystal toward the Z-axis direction of the quartz crystal rotates the plane of vibration of the light (precisely, the plane of vibration of the electric field of light, which will be referred to hereinafter as the vibration plane) while it remains as linearly polarized light. An angle of rotation is proportional to a distance (optical path length) of travel in the crystal and the angle of rotation increases with decrease in wavelength in the visible to ultraviolet wavelength region. Whether the vibration plane rotates clockwise or counterclockwise in the quartz crystal is determined by whether the quartz crystal is right-handed quartz or left-handed quartz.

The quartz crystal is a crystal belonging to point group 32 and there are two types of crystals, $P3_121$ having clockwise 3-fold screw axes and $P3_221$ having counterclockwise 3-fold screw axes around the Z-axis direction, in terms of space groups. This originates in the fact that the atom arrangement around the Z-axis of quartz crystal is helical, and there are quartz crystals in two types of atom arrangement, right-handed quartz and left-handed quartz, depending upon directions of helical rotation.

The optical rotatory power is an intrinsic phenomenon in crystals and the degree of the effect differs depending upon individual materials, whereas the presence or absence thereof and anisotropy of the behavior in the presence case are phenomena uniquely determined from the symmetry of crystal structure. For example, in the case of LBO (point group mm2) and BBO (point group 3m) as common nonlinear optical crystals and lithium niobate and tantalum niobate (both of which belong to point group 3m) as common quasi phase matching elements, the optical rotatory power itself does not exist from the symmetry of crystal. On the other hand, CLBO (point group −4m2) has the optical rotatory power, but there is no report to verify that it has a significant level of optical rotatory power and it is hardly used in the Z-axis direction in which optical rotation is a significant problem, in relation with phase matching. In contrast to it, point group 32 to which the quartz crystal belongs has the symmetry with the optical rotatory power, the effect thereof is maximum in the Z-axis direction applied in the quasi phase matching, and the point group 32 is a group of substances with extremely large optical rotatory power.

The existence of the optical rotatory power in the quartz crystal radically shakes the concept of wavelength conversion by the conventional phase matching and, particularly, in the case of significant optical rotatory power, the conventional phase matching becomes substantially disabled. The below will specifically describe a problem in phase matching in a crystal with optical rotatory power.

The conventional phase matching uses the technique of injecting the fundamental wave of linearly polarized light and thereby generating the second harmonic of linearly polarized light. In this case, the incident linearly polarized light and the linearly polarized light of the generated second harmonic both are adjusted so as to have the vibration plane in the crystal orientation corresponding to an eigen-polarization of the nonlinear optical crystal. The reason for it is as follows: in the case where a crystal has no optical rotatory power, or in the case where a crystal has an optical rotatory power which is ignorable, light traveling in the crystal is preserved without change during the process of travel in the crystal only if it is linearly polarized light corresponding to an eigen-polarization of the crystal. Unless this condition is met, light traveling in the crystal is decomposed into a pair of linearly polarized waves corresponding to eigen-polarizations of the crystal and the polarization state thereof varies with time because of a phase difference made between them during the process of propagation in the crystal. The concept of phase matching does not hold in a state in which the polarization state of propagating light varies as described above. Therefore, the phase matching can be achieved only on the assumption that it is possible to use linearly polarized light corresponding to the eigen-polarization, the polarization state of which in the crystal does not vary with time.

In contrast to it, in the case of a crystal with an optical rotatory power like the quartz crystal, linearly polarized light traveling in the crystal varies without being preserved, except for an extra crystal orientation, and the concept of the conventional phase matching based on the assumption of linearly polarized light becomes unapplicable. In the case of the quartz crystal, it appears most outstandingly in the Z-axis direction and a behavior of linearly polarized light incident in this direction is expressed as a composition of two left- and right-handed circularly polarized waves with different refractive indices in the crystal, which demonstrate such a behavior that the vibration plane thereof rotates during the process of propagation in the crystal.

When the degree of the optical rotatory power is evaluated by rotatory power ρ corresponding to an angle of rotation of linearly polarized light occurring in a given optical path length, the optical rotatory power can be ignored in a crystal with small ρ, e.g., in a crystal showing a rotation angle of several degrees in the crystal in an element length. However, the quartz crystal demonstrates rotation of about 360° in a common element length of about 1 cm in the visible region, and therefore a very serious problem arises in the phase matching as described below. In addition, ρ becomes more pronounced with decrease in wavelength and the vibration plane is considered to rotate in about ten cycles in an element length of 1 cm in the vacuum ultraviolet region of about 193 nm. Therefore, the conventional phase matching based on the assumption of linearly polarized light is no longer applicable to the phase matching in this wavelength region.

The below will specifically describe a problem in the case where the conventional phase matching with linearly polarized light (quasi phase matching) is attempted in the Z-axis direction of the quartz crystal. FIG. 1 shows an electric field Eω of a fundamental wave L1 of frequency ω traveling in the Z-axis direction of the quartz crystal and a second-order nonlinear component P2ω of polarization generated thereby. In FIG. 1, an orientation of an arrow of the fundamental wave L1 indicates a direction of light. In the description hereinafter, for example, a vector Eω in formulae will be expressed as $E^\omega$ and its components in respective axial directions as $E_x^\omega$ and $E_1^\omega$. Let us define the X-axis of the quartz crystal as a reference axis, φ as an angle of the Eω vector from the X-axis, and ψ as an angle of the P2ω vector from the X-axis. Under this definition, let us consider a relation of Eω and P2ω. Eω can be expressed as follows in the form of a column vector.

[Math 43]

$$\begin{pmatrix} E_1^\omega \\ E_2^\omega \\ E_3^\omega \end{pmatrix} = \begin{pmatrix} E^\omega \cos\phi \\ E^\omega \sin\phi \\ 0 \end{pmatrix} = E_0 \cos\{\omega t - k(\omega)z\} \begin{pmatrix} \cos\phi \\ \sin\phi \\ 0 \end{pmatrix}$$

P2ω induced thereby is given as a product with the tensor of nonlinear optical constants because the quartz crystal has the symmetry of point group 32.

[Math 44]

$$\begin{pmatrix} P_1^{2\omega} \\ P_2^{2\omega} \\ P_3^{2\omega} \end{pmatrix} = \varepsilon_0 \begin{pmatrix} d_{11} & -d_{11} & 0 & 0 & 0 & 0 \\ 0 & 0 & 0 & 0 & 0 & -d_{11} \\ 0 & 0 & 0 & 0 & 0 & 0 \end{pmatrix}$$

$$\begin{pmatrix} E_0^2 \cos^2\phi (1/2)\cos\{2\omega t - 2k(\omega)r\} \\ E_0^2 \sin^2\phi (1/2)\cos\{2\omega t - 2k(\omega)r\} \\ 0 \\ 0 \\ 0 \\ 2E_0^2 \cos\phi\sin\phi (1/2)\cos\{2\omega t - 2k(\omega)r\} \end{pmatrix}$$

$$= \frac{1}{2}\varepsilon_0 d_{11} E_0^2 \cos\{2\omega t - 2k(\omega)z\} \begin{pmatrix} \cos 2\phi \\ -\sin 2\phi \\ 0 \end{pmatrix}$$

In the expression, $\varepsilon_0$ represents the permittivity of vacuum and $E_0$ a constant (amplitude of the electric field vector). The amplitude and direction of P2ω are calculated as follows from this relation.

[Math 45]

$$|P^{2\omega}| = \sqrt{(P_1^{2\omega})^2 + (P_2^{2\omega})^2}$$

$$= \frac{1}{2}\varepsilon_0 d_{11} E_0^2 \cos\{2\omega t - 2k(\omega)z\}$$

$$\psi = \tan^{-1}\left[\frac{P_2^{2\omega}}{P_1^{2\omega}}\right]$$

$$= \tan^{-1}\left[\frac{-\sin 2\phi}{\cos 2\phi}\right]$$

$$= \tan^{-1}[-\tan 2\phi]$$

$$= -2\phi$$

Namely, it is seen that during one cycle of the vibration direction φ of the fundamental wave in the crystal, P2ω rotates at a double rate in the opposite direction while the amplitude thereof is constant independent of φ.

Figure 2:
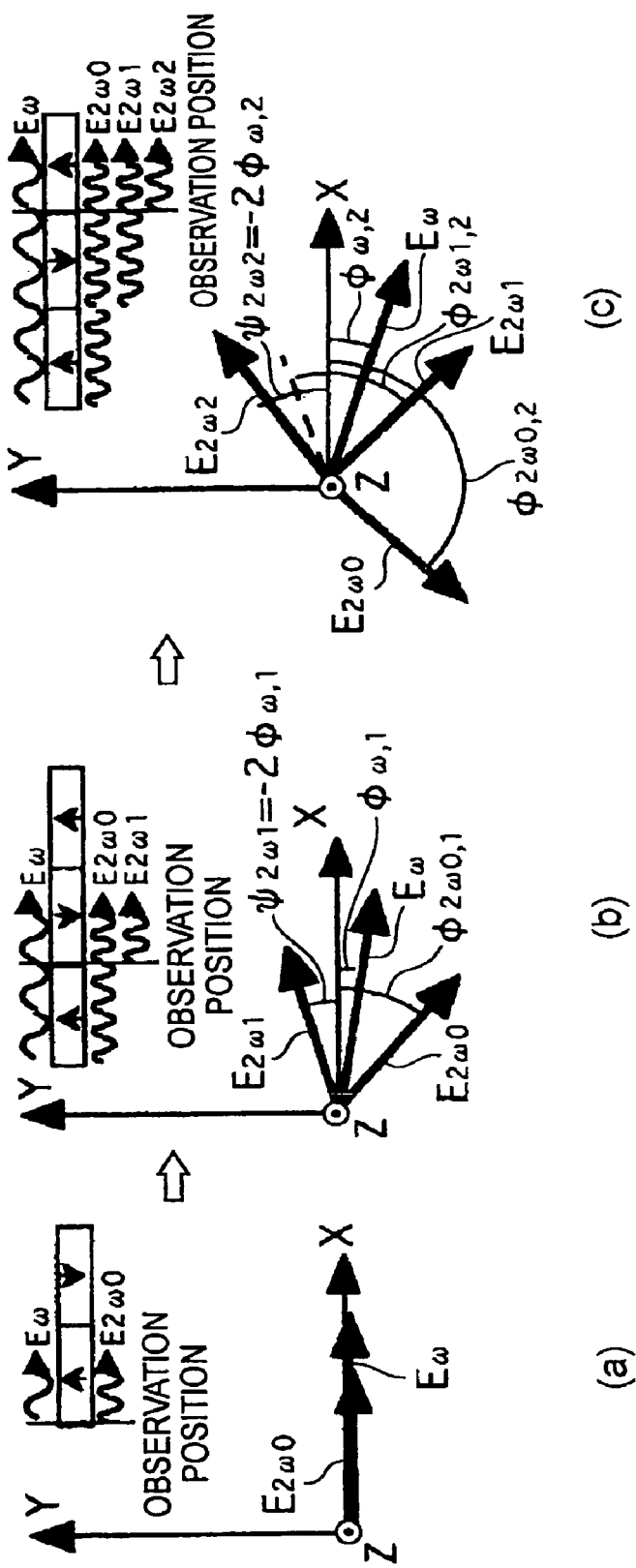
FIG. 2 is a drawing showing states of second harmonic generation and phase matching in a QPM quartz crystal.

An illustration based on this is FIG. 2 showing states of second harmonic generation and phase matching in the QPM quartz crystal. In FIG. 2, Eω of the fundamental wave is parallel to the X-axis direction at the time of incidence into the quartz crystal and the second harmonic E2ω0 due to P2ω generated is also parallel thereto (FIG. 2 (a)). FIG. 2 (a) shows the case of Phase 0 where the observation position is near the entrance. Namely, FIG. 2 (a) shows the second harmonic generation near the entrance of the quartz crystal. In FIG. 2 (a), rays propagate in the Z-direction and the direction of the electric field of the fundamental wave is assumed to be the +X direction. In FIG. 2 (a), E2ω0 represents the electric field component of the second harmonic generated from P2ω.

FIG. 2 (b) shows a state of first occurrence of quasi phase matching. FIG. 2 (b) shows the case of Phase 1 where the observation position is a first inversion position. The fundamental wave travels by a coherence length and a first, second harmonic appears in the same phase as the second harmonic near the entrance. During this period, however, the fundamental wave rotates clockwise by φω,1, and the second harmonic generation occurs in a direction of −2φω,1 on the opposite side of the X-axis. During this period the second harmonic generated immediately after incidence has rotated clockwise by φ2ω0,1.

FIG. 2 (c) shows the second quasi phase matching. FIG. 2 (c) shows the case of Phase 2 where the observation position is a second inversion position. The fundamental wave has traveled by double the coherence length and a second, second harmonic appears in the same phase as that near the entrance. However, the fundamental wave has already rotated clockwise by φω,2 and the second harmonic generation occurs in a direction of −2φω,2 on the opposite side of the X-axis. During this period the second harmonic generated immediately after incidence has rotated largely clockwise and E2ω1 also rotates following it. At this time, there are the three second harmonics E2ω0, E2ω1, and E2ω2 in the same phase and with different vibration directions on the same wavefront.

In the QPM quartz crystal, as described above, the second harmonics in the same phase and with different directions of the electric field are reproduced according to the length of the element. In the case of the conventional quasi phase matching without optical rotatory power, these second harmonics all are matched in the same direction of the electric field and thus are always in a reinforcing relation as a result of superposition. In the case of the quasi phase matching of the quartz crystal with optical rotatory power, however, the second harmonics are in the same phase but have different directions of the electric field, and therefore simple addition is not applicable. In a case of significant rotation, there appear a pair of second harmonics with opposite directions of the electric field and these completely cancel each other. Therefore, the level of this problem largely differs depending upon the magnitude of optical rotatory power p and the element length.

Figure 3:
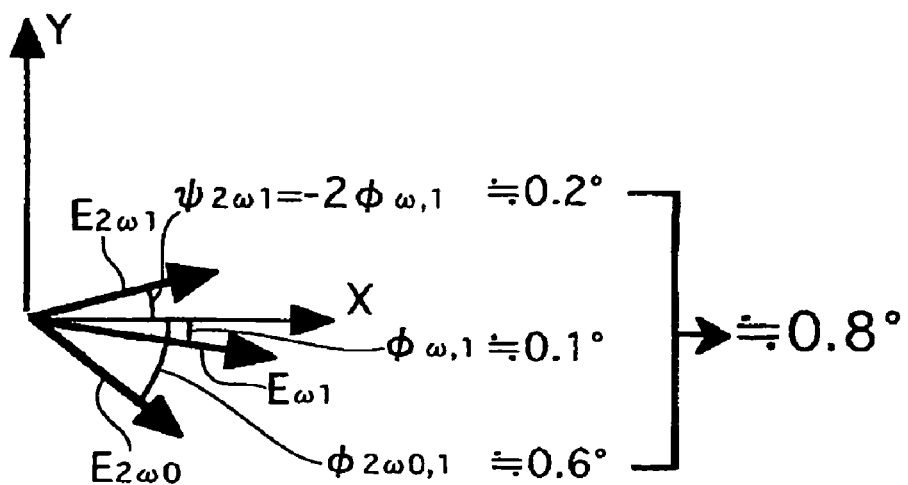
FIG. 3 is a drawing showing a state of generation of second harmonics in an identical phase.

For example, where the second harmonic of 193 nm is generated from 386 nm with the QPM quartz crystal having the element length of 1 cm, supposing it has the rotatory power of about 50°/mm for the 386 nm light and about 300°/mm for the 193 nm light, the fundamental wave rotates clockwise by approximately one and half cycles, the direction of the electric field upon generation of the second harmonic is at about three cycles counterclockwise, and the second harmonic generated at the entrance rotates clockwise by ten cycles before arrival at the exit. When it is considered that the coherence length (Lc) in this case is approximately 2 μm, second harmonics in the same phase are continually generated in a relation in which the vibration direction is inclined at intervals of 0.8° as shown in FIG. 3. If they are generated in a cycle of 360°, they will cancel each other virtually completely. FIG. 3 shows the case of Phase 1 where the observation position is the first inversion position. As shown in FIG. 3, the angle between the second harmonic E2ω0 and the second harmonic E2ω1 is approximately 0.8°.

Therefore, an amount of second harmonics generated increases and decreases periodically in a period of the optical path length of about 1 mm in which cancellation of one cycle is completed; therefore, the amount of second harmonics generated increases in the range of not more than about 0.5 mm corresponding to a region of not more than half cycle. This means that an effective path length is approximately 0.5 mm in the second harmonic generation of 193 nm in the QPM quartz crystal. When it is considered that the efficiency of second harmonic generation is determined by a square of the effective path length in a medium, the wavelength conversion function is said to rarely work well.

For meeting such desires, the present embodiment can provide a wavelength conversion element, a wavelength conversion method, and a light source device capable of efficiently generating the second harmonic from the fundamental wave.

Experimental Example of First Embodiment

Figure 10:
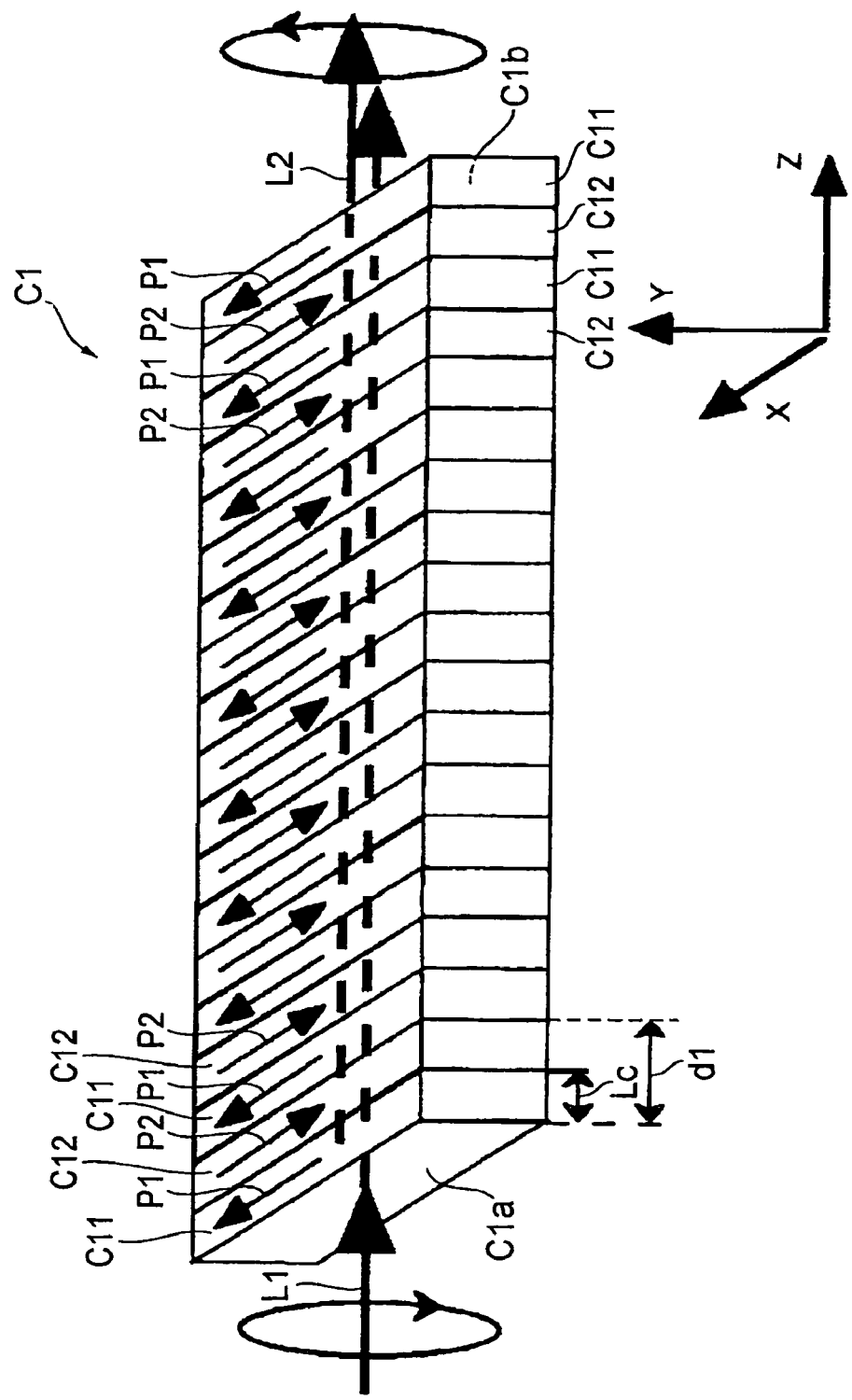
FIG. 10 is a drawing showing a schematic configuration of an element used in an experimental example of the first embodiment.

For achieving the phase matching with circularly polarized light in the QPM quartz crystal, a wavelength conversion experiment was conducted to implement wavelength conversion from 1064 nm to 532 nm by producing an element C1 for making the fundamental wave of left-handed circularly polarized light incident thereinto and generating the second harmonic of right-handed circularly polarized light. The element C1, as shown in FIG. 10, has a periodic structure in the Z-axis direction, in which the polarities in the X-axis direction are periodically inverted (the polarity directions are indicated by arrows in FIG. 10) and in which boundaries between domains with different polarities are perpendicular to the Z-axis direction (i.e., {0001} planes). The element C1 is of a plate shape of 8 mm in the Z-direction, 3 mm in the X-direction, and 1 mm in the Y-direction. The end faces in the Z-axis direction for incidence of the fundamental wave L1 of left-handed circularly polarized light and for emergence of the second harmonic L2 of right-handed circularly polarized light are optically polished, the entrance end face C1a is coated with an antireflection coating for 1064 nm light, and the exit end face C1b is coated with an antireflection coating for the two wavelengths of 1064 nm light and 532 nm light. The entrance end face C1a receives the fundamental wave L1 having a predetermined wavelength (1064 nm herein) and a predetermined frequency and the second harmonic L2 emerges from the exit end face C1b.

The element C1 has a plurality of first regions C11 having a polarity direction P1 along the +X-axis direction and a plurality of second regions C12 having a polarity direction P2 along the −X direction opposite to the +X direction. The plurality of first and second regions C11, C12 are formed as alternately arranged in a period d1 along the Z-axis direction of the crystal between the entrance end face C1a and the exit end face C1b.

The coherence length (Lc), which is a distance where the phase difference becomes π between second harmonics L2 continually generated in the optical path of the fundamental wave L1, i.e., the distance where the cancellation of second harmonics starts, is as follows in the present experiment condition, where λ is the wavelength of the fundamental wave L1, $n^-(\omega)$ is the refractive index of left-handed circularly polarized light of the fundamental wave L1, and $n^+(2\omega)$ is the refractive index of right-handed circularly polarized light of the second harmonic.

[Math 46]

$$Lc = \frac{\lambda}{4(n^+(2\omega) - n^-(\omega))}$$

The inversion period d1 of the periodic structure is substantially equal to d represented by the following expression.

[Math 47]

$$d = \frac{m\lambda}{2(n^+(2\omega) - n^-(\omega))}$$

In this expression m is a number indicating an order of QPM, and natural number. In the present experiment the first-order quasi phase matching was achieved and d was 42 μm. For precise phase matching, however, adjustment was conducted by slightly inclining the direction of incidence of the fundamental wave.

The element C1 was produced by making use of the twin forming phenomenon inside the quartz crystal by application of stress using a pneumatic press machine. Since the quartz crystal is not a ferroelectric, the polarity inversion with application of an electric field as in the conventional QPM elements is not available. Then the polarity inversion is implemented by making use of change in Gibbs free energy in the quartz crystal with application of stress. By calculating a relation between directions of applied stress to the crystal and amounts of Gibbs energy accumulated in the quartz crystal, stress is applied from such a crystal orientation that it is advantageous in terms of energy to cause formation of twins accompanying the polarity inversion in the X-axis direction.

At this time, periodical stress application is carried out so that regions with occurrence of twin formation and regions without occurrence of twin formation are periodically arranged in the Z-direction. For the periodical stress application, a periodic uneven structure with the desired period is formed in a target surface of the quartz crystal and a uniform stress is then applied thereto. The polarity inversion with twin formation occurs in projection portions where the stress is applied, whereas the polarity remains invariant in depression portions without application of stress. The reason why the polarity inversion in the X-axis direction is necessary is that the polarities in second harmonic generation are dominated by the polarities in the X-axis direction. As a twin boundary, i.e., a boundary between two domains with different polarities, the {0001} plane perpendicular to the Z-axis is naturally selected from crystallographic stability of twins themselves. In the element C1, the first and second regions C11, C12 are formed as alternately arranged in the period d1 substantially equal to d expressed by the aforementioned expression, between the entrance end face C1a and the exit end face C1b.

Figure 11:
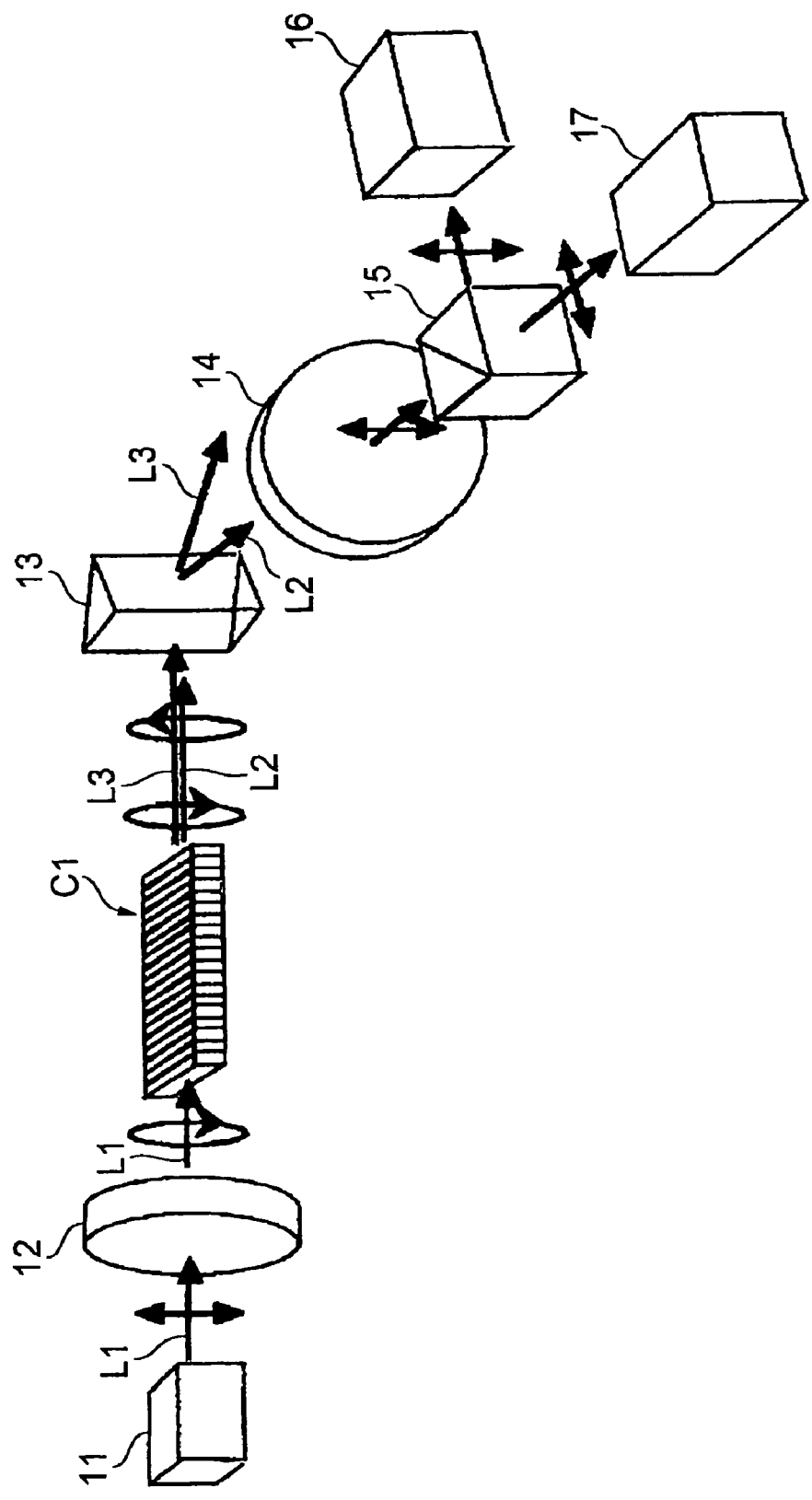
FIG. 11 is a drawing showing a schematic configuration of an experiment instrument used in the experimental example of the first embodiment.

A setup of an experiment instrument is shown in FIG. 11. A fundamental wave light source 11 used was a Nd:YAG laser (wavelength: 1064 nm). A λ/4 plate (quarter wave plate) 12 was used to convert the fundamental wave L1 from linearly polarized light to left-handed circularly polarized light and then the fundamental wave L1 was made incident in a direction substantially perpendicular to the polarity direction, into the QPM quartz crystal element C1. The second harmonic of right-handed circularly polarized light (532 nm) L2 generated by wavelength conversion is converted into linearly polarized light by a λ/4 plate 14 for second harmonic. On the other hand, the remaining fundamental wave L3 of left-handed circularly polarized light not used for wavelength conversion is converted into left-handed elliptically polarized light by the λ/4 plate 14 for second harmonic. The second harmonic L2 and the fundamental wave L3 are separated by a prism 13 and then detectors 16 and 17 measure the output. At this time, the setup is arranged in such a manner that when the generated second harmonic is right-handed circularly polarized light as expected, the λ/4 plate 14 is arranged so that it is converted into vertically vibrating linearly polarized light by the λ/4 plate, and that the signal is detected by the detector 16 only. In this case, if the second harmonic L2 is left-handed circularly polarized light, it is converted into horizontally vibrating linearly polarized light the λ/4 plate 14 and the signal is detected by the detector 17 only; if it is elliptically polarized light, it is converted into elliptically polarized light by the λ/4 plate 14 and the signal is detected by both of the detectors 16 and 17.

It was confirmed by the result of the experiment that with the incident fundamental wave having the average pulse laser output of 3.1 W, the repetition frequency of 30 kHz, the pulse time width of 8.8 nsec, and the beam diameter of 200 μm, the detector 16 detected the signal of the second harmonic at 105 mW and the wavelength conversion from 1064 nm to 532 nm by the phase matching of circularly polarized light was achieved. It was also confirmed that the output detected by the detector 17 was always independent of the output of the incident fundamental wave and was not more than 1% of that of the detector 16, and that the second harmonic was right-handed circularly polarized light.

Second Embodiment

The phenomenon of the optical rotatory power is a phenomenon with extremely high anisotropy depending on crystal orientations. As a result, there is also a crystal orientation where no optical rotatory power appears. In this orientation, the second harmonic generation can be achieved by the conventional phase matching technology even if a crystal has an optical rotatory power. Therefore, by finding a crystal orientation in which there is no optical rotatory power in a nonlinear optical crystal of interest, it becomes feasible to achieve second harmonic generation while avoiding the reduction in efficiency due to the optical rotatory phenomenon.

There is ellipticity as one of quantities to measure the crystal orientation dependence of the optical rotatory power. In a crystal without optical rotatory power, incident light is decomposed into a pair of two linearly polarized waves called eigen-polarizations. The eigen-polarizations are in a relation in which their vibration planes of the electric field are perpendicular to each other, and the vibration planes are uniquely determined by the crystal orientation of the incident light. Light traveling in a crystal is expressed as superposition of the pair of eigen-polarizations, and in general, since two eigen-polarizations have different indices of refraction, there occurs a phase difference between them during the process of propagation in the crystal; as a result, the polarization state of the light traveling in the crystal varies with propagation. Namely, the polarization state is not preserved. Only if the light traveling in the crystal is linearly polarized light corresponding to an eigen-polarization, the polarization state thereof is preserved without change during the process of travel in the crystal.

The phase matching is achieved by making use of the linearly polarized light corresponding to the eigen-polarization. The reason for it is that the concept of phase matching to match phases of second harmonics continually generated during the process of propagation of the fundamental wave in the crystal is one based on the assumption that the state of linearly polarized light of the fundamental wave to determine the generation state of the second harmonic is preserved during the process of propagation in the crystal and that the linearly polarized light state of the second harmonic itself generated is preserved.

However, this precondition is not satisfied in crystals with optical rotatory power. Linearly polarized light in the crystals with optical rotatory power is nothing but a state of superposition of right-handed elliptically polarized light and left-handed elliptically polarized light with different refractive indices. However, the ellipticity of the elliptically polarized light, i.e., a ratio of minor axis to major axis of an ellipse, differs depending upon crystal orientations, and the ellipticity can be 0 under a certain special condition. The ellipticity of 0 means linearly polarized light, which means that only in this direction the light propagating in the crystal is expressed as superposition of linearly polarized waves with different refractive indices and the crystal demonstrates the same behavior as a crystal without optical rotatory power.

In a crystal with optical rotatory power, the crystal orientation where the ellipticity is 0 is an orientation in which below-described gyration tensor G becomes 0. Therefore, where the phase matching is achieved in the crystal orientation where G is substantially 0, the phase matching with linearly polarized light can be achieved and it is true in phase matching of all optically active crystals.

However, a more specific periodic structure for achieving the phase matching by quasi phase matching differs depending upon the symmetry of the crystal used and the way of phase matching. The following forms show expressions including all of them.

[Math 48]

$$d = \frac{m\lambda}{2(n_{1G=0}(2\omega) - n_{1G=0}(\omega))} \quad (7)$$

$$d = \frac{m\lambda}{2(n_{1G=0}(2\omega) - n_{2G=0}(\omega))} \quad (8)$$

$$d = \frac{m\lambda}{2(n_{2G=0}(2\omega) - n_{1G=0}(\omega))} \quad (9)$$

$$d = \frac{m\lambda}{2(n_{2G=0}(2\omega) - n_{2G=0}(\omega))} \quad (10)$$

In the above expression, λ is the wavelength of the fundamental wave, $n_{1G=0}$ and $n_{2G=0}$ represent the refractive indices of two orthogonal eigen-polarizations in the crystal orientations where G is substantially 0, $n_{1G=0}(2\omega)$ the refractive index of the second harmonic, $n_{1G=0}(\omega)$ the refractive index of the fundamental wave, $n_{2G=0}(2\omega)$ the refractive index of the second harmonic, $n_{2G=0}(\omega)$ the refractive index of the fundamental wave, and m an order of QPM and natural number. In a biaxial optical crystal having three different principal values of an index ellipsoid, $n_{1G=0}$ and $n_{2G=0}$ can be simply considered to be refractive indices of two orthogonal eigen-polarizations in the crystal orientations where G is substantially 0. These values can be readily calculated from the index ellipsoid of the crystal after the crystal orientations in which G is substantially 0 in the crystal used are determined by a method as shown in a below-described example. Formula (7) or Formula (10) is applied to the phase matching in which the polarization of the fundamental wave is parallel to the polarization of the harmonic, and Formula (8) or Formula (9) is applied to the phase matching in which the polarization of the fundamental wave is perpendicular to the polarization of the harmonic.

In the case of a uniaxial optical crystal in which only one principal value is different from the others of the three principal values of the index ellipsoid, it can be considered that $n_{1G=0}$ is the ordinary index $n_o$ and $n_{2G=0}$ the extraordinary index in the crystal orientation where G is substantially 0. An ordinary ray in a uniaxial optical crystal is light with a property of having a fixed index value in all the crystal orientations, and thus $n_{1G=0}$ is a fixed value $n_o$ independent of the crystal orientations. On the other hand, where the crystal orientation where G is substantially 0 is expressed by an angle θ from the optical axis of the index ellipsoid, the extraordinary index in the crystal orientation where G is substantially 0 can be expressed by the following replacement expression.

[Math 49]

$$\sqrt{\frac{n_o^2 \times n_e^2}{n_e^2 \cos^2\theta + n_o^2 \cos^2\theta}}$$

It is the refractive index of extraordinary light in the orientation perpendicular to the optical axis herein.

Therefore, for example, in a case where the quasi phase matching using the nonlinear optical effect of d12 is achieved in a crystal in point group 32 which is a nonlinear optical crystal with optical rotatory power and uniaxial optical crystal, the incident fundamental wave is extraordinary light while the harmonic generated is ordinary light; therefore, the periodic structure can be expressed by the below expression with replacements of $n_{1G=0}=n_o$ and $n_{2G=0}$ as defined below, in Formula (9).

[Math 50]

$$n_{2G=0} = \sqrt{\frac{n_o^2 \times n_e^2}{n_e^2 \cos^2\theta + n_o^2 \cos^2\theta}}$$

[Math 51]

$$d = \frac{m\lambda}{2\left(\sqrt{\frac{n_o^2 \times n_e^2}{n_e^2 \cos^2\theta + n_o^2 \cos^2\theta}}(2\omega) - n_o(\omega)\right)}$$

Particularly, in a case where the quasi phase matching is achieved using the nonlinear optical effect of d11, the incident fundamental wave and the generated harmonic both are ordinary light and thus the periodic structure is expressed by the following expression with replacement of $n_{1G=0}=n_o$ in Formula (7).

[Math 52]

$$d = \frac{m\lambda}{2(n_o(2\omega) - n_o(\omega))}$$

Therefore, there is no need for giving consideration to anisotropy of refractive index depending upon crystal orientations, for the periodic structure itself as long as the element is made using the crystal orientation where G is substantially 0. An experimental example of the second embodiment described below shows an example of the quasi phase matching using the nonlinear optical effect of d11 of the quartz crystal, corresponding to this condition.

The crystal point groups with optical rotatory power are classified into three classes of optically isotropic crystals, uniaxial optical crystals, and biaxial optical crystals as follows. (It should be, however, noted that in the following expression a notation for axes of rotatory inversion to originally be provided with "–" above each numeral is replaced by a notation of "–" in front of each numeral for the reason of word-processing software. Examples: –4, –42m, etc.)

Optically isotropic crystals: point group 23 and point group 432;

Uniaxial optical crystals: point group 3, point group 32, point group 6, point group 622, point group 4, point group 422, point group –4, and point group –42m;

Biaxial optical crystals: point group 1, point group 2, point group m, point group mm2, and point group 222.

On the other hand, the crystal point groups having the nonlinear optical effect are as follows.

Uniaxial optical crystals: point group 3, point group 32, point group 3m, point group 6, point group –6, point group 6mm, point group –6m2, point group 4, point group –4, point group 4mm, and point group –42m;

Biaxial optical crystals: point group 1, point group 2, point group m, point group mm2, and point group 222.

Therefore, the nonlinear optical crystals with optical rotatory power, which are objects of interest herein, are as follows.

Uniaxial optical crystals: point group 3, point group 32, point group 6, point group 4, point group –4, and point group –42m;

Biaxial optical crystals: point group 1, point group 2, point group m, point group mm2, and point group 222.

The method described in the second embodiment is effective to the crystals belonging to all the crystal point groups listed herein. In this connection, the period of quasi phase matching can be expressed by the aforementioned expression, for each of the uniaxial optical crystals and the biaxial optical crystals.

Incidentally, the phase matching by linearly polarized light described in the second embodiment is the phenomenon occurring only in the crystal orientations where the condition of G=0 is met, in the strict sense, but it is expected that there is a considerable width of practically available crystal orientations. It is because orientations in which the ellipticity of eigen-polarizations in the optically active materials shows values near 0 widely exist around the orientations of G=0. Even if an eigen-polarization is not accurate linearly polarized light, it can be suitably regarded as almost linearly polarized light in the phase matching in a region where the ellipticity is very small. According to the result of consideration from the viewpoint of wavelength conversion efficiency, such a region covers crystal orientations in the range where the ellipticity γ is not more than 0.1. Therefore, the present embodiment can be regarded as effective in the range where the ellipticity γ is not more than 0.1, preferably, in the range of not more than 0.05 centered on the crystal orientation of G=0. The range where γ is not more than 0.05 herein corresponds to the range of $0 \leq G \leq 1.135 \times 10^{-4}$.

The periodic structure in that case can be expressed by the following expression.

[Math 53]

$$d = \frac{m\lambda}{2(n_1(2\omega) - n_1(\omega))} \quad (3)$$

-continued $$d = \frac{m\lambda}{2(n_1(2\omega) - n_2(\omega))} \quad (4)$$

$$d = \frac{m\lambda}{2(n_2(2\omega) - n_1(\omega))} \quad (5)$$

$$d = \frac{m\lambda}{2(n_2(2\omega) - n_2(\omega))} \quad (6)$$

It is, however, noted that λ represents the wavelength of the fundamental wave, $n_1$ and $n_2$ the refractive indices of two orthogonal eigen-polarizations in the ray direction, $n_1(2\omega)$ the refractive index of the second harmonic, $n_1(\omega)$ the refractive index of the fundamental wave, $n_2(2\omega)$ the refractive index of the second harmonic, $n_2(\omega)$ the refractive index of the fundamental wave, and m an order of QPM and natural number. In the biaxial optical crystals in which the three principal values of the index ellipsoid are different from each other, $n_1$ and $n_2$ can be simply regarded as refractive indices of two orthogonal eigen-polarizations in the crystal orientation (ray orientation) in which the phase matching is achieved. These values can be readily calculated from the index ellipsoid of the crystal after the crystal orientation of the crystal used is determined. Formula (3) or Formula (6) is applied to the phase matching in which the polarization of the fundamental wave is parallel to the polarization of the harmonic, and Formula (4) or Formula (5) is applied to the phase matching in which the polarization of the fundamental wave is perpendicular to the polarization of the harmonic.

In the case of the uniaxial optical crystals in which only one of the three principal values of the index ellipsoid is different from the others, $n_1$ can be regarded as the refractive index $n_o$ of ordinary light and $n_2$ as the refractive index of extraordinary light in the crystal orientation of substantially G=0. Since the ordinary light in the uniaxial optical crystal is light with such a property that it has a fixed index value in all the crystal orientations, $n_1$ becomes a fixed value $n_o$ independent of the crystal orientations. On the other hand, the refractive index of extraordinary light can be expressed as follows when the crystal orientation in which the phase matching is achieved or in which the ray travels, which is the orientation where the ellipticity γ is not more than 0.1 in this case, is expressed by an angle θ from the optical axis of the index ellipsoid.

[Math 54]

$$\sqrt{\frac{n_o^2 \times n_e^2}{n_e^2\cos^2\theta + n_o^2\cos^2\theta}}$$

In this expression $n_e$ represents the refractive index of extraordinary light in the direction perpendicular to the optical axis.

Therefore, for example, in a case where the quasi phase matching using the nonlinear optical effect of d12 is achieved in a crystal in point group 32 which is a nonlinear optical crystal with optical rotatory power and uniaxial optical crystal, the incident fundamental wave is extraordinary light while the generated harmonic is ordinary light; therefore, the periodic structure can be expressed by the below expression with replacements of $n_1=n_o$ and $n_2$ as defined below, in Formula (5).

[Math 55]

$$n_2 = \sqrt{\frac{n_o^2 \times n_e^2}{n_e^2\cos^2\theta + n_o^2\cos^2\theta}}$$

[Math 56]

$$d = \frac{m\lambda}{2\left(\sqrt{\frac{n_o^2 \times n_e^2}{n_e^2\cos^2\theta + n_o^2\cos^2\theta}}(2\omega) - n_o(\omega)\right)}$$

Particularly, in a case where the quasi phase matching is achieved using the nonlinear optical effect of d11, the incident fundamental wave and the generated harmonic both are ordinary light and thus the periodic structure is expressed by the following expression with replacement of $n_1=n_o$ in Formula (3).

[Math 57]

$$d = \frac{m\lambda}{2(n_o(2\omega) - n_o(\omega))}$$

The periodic structure itself is determined without need for consideration to the anisotropy of refractive index depending upon crystal orientations. It should be noted that this phase matching method is not applicable only to the quasi phase matching but is also naturally applicable to the ordinary phase matching using birefringence.

The ellipticity γ in the optically active crystals can be expressed as follows.

[Math 58]

$$\gamma = \tan\left\{\frac{1}{2}\tan^{-1}\left[\frac{G}{(n_1 - n_2) \times \sqrt{n_1 \times n_2}}\right]\right\}$$

In the above formula, G is defined as follows.

[Math 59]

$$G = \sum_{i=1}^{3}\sum_{j=1}^{3} g_{ij} a_i a_j$$

In this expression $g_{ij}$ is an ij entry in the gyration tensor of the nonlinear optical crystal of interest, and $a_i$ and $a_j$ are components of a normal vector to the wavefront of the fundamental wave. Furthermore, $n_1$ and $n_2$ are the refractive indices of the crystal on the assumption that there is no optical rotatory power (the two refractive indices mean the existence of birefringence).

In order to know a specific expression form of γ, it is necessary to know the gyration tensor and the index ellipsoid of the medium of interest. When we know the point group to which the crystal belongs, we can make an expression where the constants are left as variables. For example, in the case of the point group 32 to which the quartz crystal belongs, the gyration tensor is expressed by the following expression.

[Math 60]

$$\begin{pmatrix} g_{11} & 0 & 0 \\ 0 & g_{11} & 0 \\ 0 & 0 & g_{33} \end{pmatrix}$$

The index ellipsoid is expressed by the following expression.

[Math 61]

$$\frac{X^2 + Y^2}{n_o^2} + \frac{Z^2}{n_e^2} = 1$$

It is seen from these expressions that the both demonstrate a behavior of rotational symmetry with respect to the Z-axis. In these expressions, $g_{11}$ is the $_{11}$ entry in the gyration tensor of the nonlinear optical crystal of interest, $g_{33}$ the $_{33}$ entry in the gyration tensor of the nonlinear optical crystal of interest, $n_o$ the so-called ordinary index of the quartz crystal (value in the direction perpendicular to the Z-axis of the index ellipsoid) without consideration to the optical rotatory power, and $n_e$ the so-called extraordinary index of the quartz crystal (value in the direction parallel to the Z-axis of the index ellipsoid) without consideration to the optical rotatory power, which is the refractive index of the quartz crystal on the assumption that there is no optical rotatory power. Since the gyration tensor and the index ellipsoid both are symmetric around the Z-axis, it is sufficient to consider only an inclination angle from the Z-axis as to the incidence direction of the fundamental wave. Therefore, where θ is an inclination angle from the c axis (or Z-axis) of the normal vector to the wavefront of the fundamental wave, the normal vector to the wavefront of the fundamental wave is given by the following expression.

[Math 62]

$$\begin{pmatrix} 0 \\ \sin\theta \\ \cos\theta \end{pmatrix}$$

Therefore, the following relation is obtained.

[Math 63]

$$G = \begin{pmatrix} 0 & \sin\theta & \cos\theta \end{pmatrix} \begin{pmatrix} g_{11} & 0 & 0 \\ 0 & g_{11} & 0 \\ 0 & 0 & g_{33} \end{pmatrix} \begin{pmatrix} 0 \\ \sin\theta \\ \cos\theta \end{pmatrix}$$

$$= g_{11}\sin^2\theta + g_{33}\cos^2\theta$$

When the index ellipsoid is transformed into a coordinate system the Z-axis of which is the wavefront normal direction, the following relation is obtained.

[Math 64]

$$\begin{pmatrix} 1 & 0 & 0 \\ 0 & \cos\theta & -\sin\theta \\ 0 & \sin\theta & \cos\theta \end{pmatrix} \begin{pmatrix} \frac{1^2}{n_o^2} & 0 & 0 \\ 0 & \frac{1^2}{n_o^2} & 0 \\ 0 & 0 & \frac{1}{n_e^2} \end{pmatrix} \begin{pmatrix} 1 & 0 & 0 \\ 0 & \cos\theta & \sin\theta \\ 0 & -\sin\theta & \cos\theta \end{pmatrix} =$$

$$\begin{pmatrix} \frac{1^2}{n_o^2} & 0 & 0 \\ 0 & \frac{1^2}{n_o^2}\cos^2\theta + \frac{1^2}{n_e^2}\sin^2\theta & \left(\frac{1^2}{n_o^2} - \frac{1^2}{n_e^2}\right)\cos\theta\sin\theta \\ 0 & \left(\frac{1^2}{n_o^2} - \frac{1^2}{n_e^2}\right)\cos\theta\sin\theta & \frac{1^2}{n_o^2}\sin^2\theta + \frac{1^2}{n_e^2}\cos^2\theta \end{pmatrix}$$

Therefore, the pair of refractive indices, when viewed from the wavefront normal direction, are given by the inverse $n_e$ of the square root of the value in the first row and the first column of the matrix and the inverse of the square root of the value in the second row and the second column of the matrix which is given by the following expression.

[Math 65]

$$\sqrt{\frac{n_o^2 \times n_e^2}{n_e^2\cos^2\theta + n_o^2\sin^2\theta}}$$

From the above, the ellipticity γ is given by the following expression.

[Math 66]

$$\gamma = \tan\left\{\frac{1}{2}\tan^{-1}\left[\frac{g_{11}\sin^2\theta + g_{33}\cos^2\theta}{\left(\sqrt{\frac{n_o^2 \times n_e^2}{n_e^2\cos^2 + n_o^2\sin^2\theta}} - n_o\right) \times \left|n_o \times \sqrt{\frac{n_o^2 \times n_e^2}{n_e^2\cos^2\theta + n_o^e\sin^2\theta}}\right|}\right]\right\}$$

As described previously, $g_{11}$ is the 11 entry in the gyration tensor of the nonlinear optical crystal of interest and $g_{33}$ the 33 entry in the gyration tensor of the nonlinear optical crystal of interest. Furthermore, θ is the inclination angle from the c axis (or Z-axis) of the normal vector to the wavefront of the fundamental wave, $n_o$ the so-called ordinary index of the quartz crystal (value in the direction perpendicular to the Z-axis of the index ellipsoid) without consideration to the optical rotatory power, and $n_e$ the so-called extraordinary index of the quartz crystal (value in the direction parallel to the Z-axis of the index ellipsoid) without consideration to the optical rotatory power, which is the refractive index of the quartz crystal on the assumption that there is no optical rotatory power.

The condition to satisfy γ=0 is G=0, i.e., the following condition needs to be met in the case where the crystal is one belonging to the point group 32 like the quartz crystal.

$$g_{11}\sin^2\theta + g_{33}\cos^2\theta = 0 \qquad \text{[Math 67]}$$

Namely, there is no need for considering influence of the optical rotatory power in a direction inclined by the following angle from the Z-axis and the phase matching by linearly polarized light can be achieved as before.

[Math 68]

$$\theta = \tan^{-1}\left[-\frac{g_{33}}{g_{11}}\right]$$

A pair of eigen-polarizations to be considered on that occasion are linearly polarized light having the vibration plane of the electric field perpendicular to the Z-axis and linearly polarized light having the vibration plane of the electric field being perpendicular thereto and including the Z-axis. The two refractive indices thereof are given as follows.

[Math 69]

$$n_o \sqrt{\frac{n_o^2 \times n_e^2}{n_o^2 \cos^2\theta + n_o^2 \sin^2\theta}}$$

The latter is defined as $n_\theta$. In the case of the QPM quartz crystal, when the fundamental wave is made incident in a linearly polarized light state parallel to either one of them, the second harmonic can be extracted in a linearly polarized light state having the vibration plane of the electric field perpendicular to the Z-axis.

Namely, the second harmonic can be efficiently output when the periodic polarity inversion structure is formed so that the positive and negative polarities periodically alternate in the aforementioned direction where the G becomes substantially 0, in the period substantially equal to d determined by aforementioned Formula (3) or Formula (4) and when the incident fundamental wave is made incident thereinto as linearly polarized light from the direction substantially perpendicular to the polarity direction and crystal orientation satisfying the condition of substantially G=0.

Figure 12:
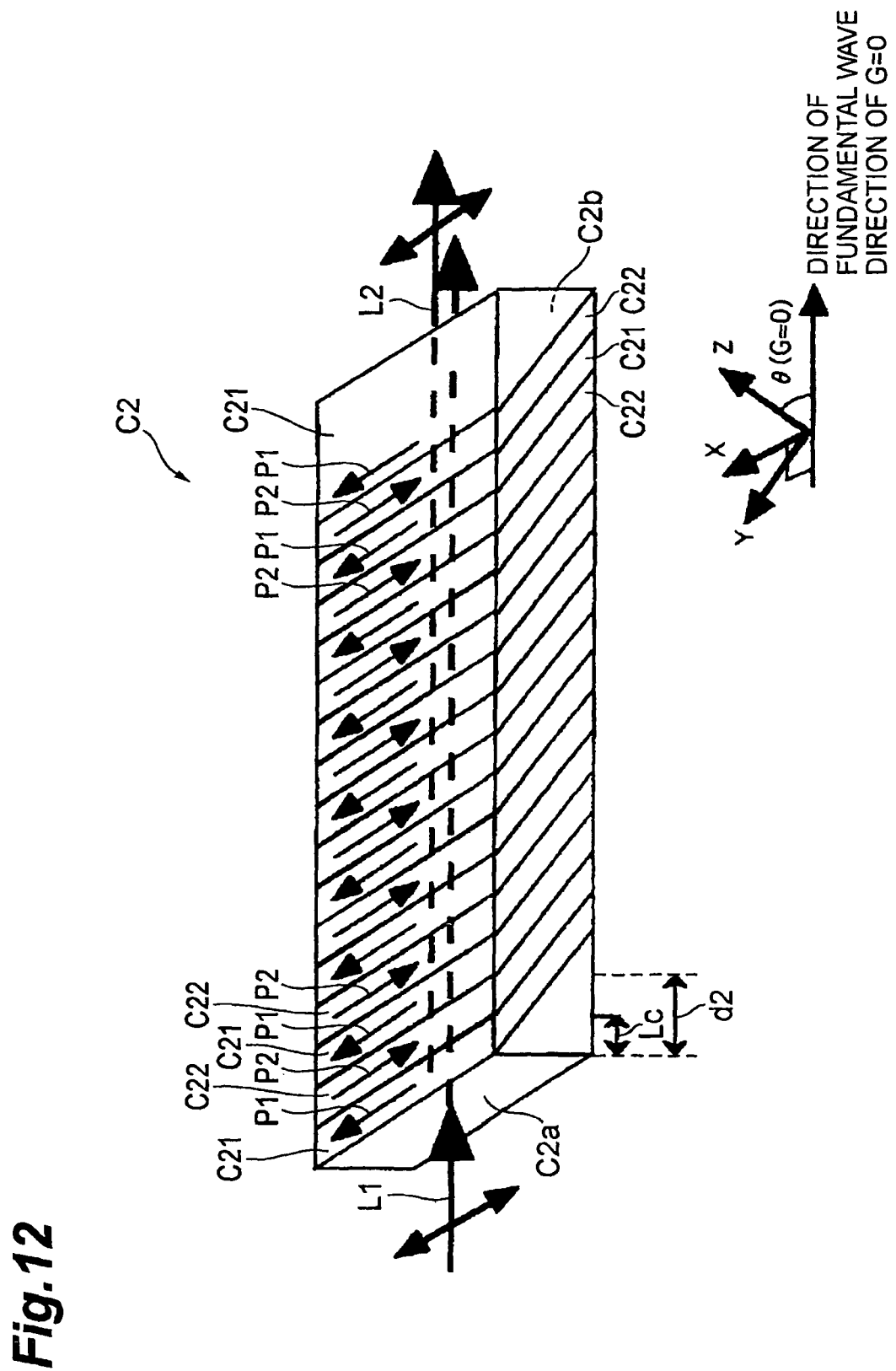
FIG. 12 is a drawing showing a schematic configuration of an element used in an experimental example of the second embodiment.

It is, however, inevitable in this case that, as shown in FIG. 12, the traveling direction of light is a direction largely inclined relative to the periodic boundaries of the periodic structure. This is because the twin boundaries of the quartz crystal must be the {0001} planes perpendicular to the Z-axis for the crystallographic reason. FIG. 12 shows the quartz crystal C2 in the periodic structure, in which the polarities in the X-axis direction are periodically inverted (the polarity directions are indicated by arrows in FIG. 12) and in which the boundaries between domains with different polarities are perpendicular to the Z-axis direction (i.e., the {0001} planes). In FIG. 12, the fundamental wave L1 of linearly polarized light is made incident into the entrance end face C2a and the second harmonic L2 of linearly polarized light emerges from the exit end face C2b. In this case, there arises a problem that a phase shift occurs in the beam of the second harmonic. Therefore, it is preferable to achieve the phase matching in the Z-axis direction in which the second harmonic generation can be implemented in the direction perpendicular to the periodic boundaries. In FIG. 12, the fundamental wave is made incident in the direction of substantially G=0.

Experimental Example of Second Embodiment

This experimental example shows the phase matching in the crystal orientation of ellipticity 0 with the QPM quartz crystal. The QPM quartz crystal element in this case is as shown in FIG. 12. The angle between the ray direction and the Z-axis is 56° and the ray direction is the crystal orientation in which the ellipticity becomes approximately 0.

For achieving the phase matching with linearly polarized light in the QPM quartz crystal, a wavelength conversion experiment was conducted to implement the wavelength conversion from 1064 nm to 532 nm by producing the element C2 for making the fundamental wave of linearly polarized light incident thereinto as ordinary light parallel to the X-axis and generating the second harmonic of linearly polarized light as ordinary light parallel to the X-axis as well. In the element C2 as shown in FIG. 12, the polarities in the X-axis direction are periodically inverted. The boundaries between domains with different polarities are perpendicular to the Z-axis direction (i.e., the {0001} planes). The element C2 is of a plate shape of 8 mm in the length direction of travel of ray, 3 mm in the X-direction being the width direction, and 1 mm in the thickness direction. The end faces for incidence of the fundamental wave L1 and for emergence of the second harmonic L2 are optically polished, the entrance end face C2a is coated with an antireflection coating for 1064 nm light, and the exit end face C2b is coated with an antireflection coating for the two wavelengths of 1064 nm light and 532 nm light. The entrance end face C2a receives the fundamental wave L1 having the predetermined wavelength (1064 nm herein) and predetermined frequency and the second harmonic L2 emerges from the exit end face C2b.

The element C2 has a plurality of first regions C21 having the polarity direction along the +X axis direction and a plurality of second regions C22 having the polarity direction along the −X direction opposite to the +X direction. The plurality of first and second regions C21, C22 are formed as alternately arranged in the period d2 between the entrance end face C2a and the exit end face C2b.

The coherence length (Lc), which is a distance where the phase difference becomes π between second harmonics continually generated in the optical path of the fundamental wave L1, i.e., the distance where the cancellation of second harmonics starts, is as follows in the present experiment condition, where λ is the wavelength of the fundamental wave L1, $n_o(\omega)$ is the ordinary index of the fundamental wave L1, and $n_o(2\omega)$ is the refractive index of the second harmonic.

[Math 70]

$$Lc = \frac{\lambda}{4(n_0(2\omega) - n_0(\omega))}$$

The inversion period d2 of the periodic structure is substantially equal to d represented by the following expression.

[Math 71]

$$d = \frac{m\lambda}{2(n_0(2\omega) - n_0(\omega))}$$

In this expression m is a number indicating an order of QPM, and natural number. In the present experiment the first-order quasi phase matching was achieved and d was 42 μm. For precise phase matching, however, adjustment was conducted by slightly inclining the direction of incidence of the fundamental wave.

The element C2 was produced by making use of the twin forming phenomenon inside the quartz crystal by application of stress using a pneumatic press machine as in Embodiment 1. On this occasion, the target press surface with the periodic uneven structure in the quartz crystal substrate subjected to application of stress was the surface inclined at 56° from the Y-axis to the direction of the Z-axis and the incident end direction of the fundamental wave L1 was made along the crystal orientation where the ellipticity was 0. In this case, the twin boundaries, or boundaries between domains with different polarities are naturally selected as the {0001} planes perpendicular to the Z-axis, from the crystallographic stability of twins themselves. Therefore, the element structure is such a structure that the periodic boundaries are obliquely arranged relative to the ray as shown in FIG. 12. In the element C2, the periodic polarity inversion structure in which the positive and negative polarities periodically alternate is formed in the period substantially equal to d represented by the aforementioned expression, between the entrance end face C2a and the exit end face C2b.

Figure 13:
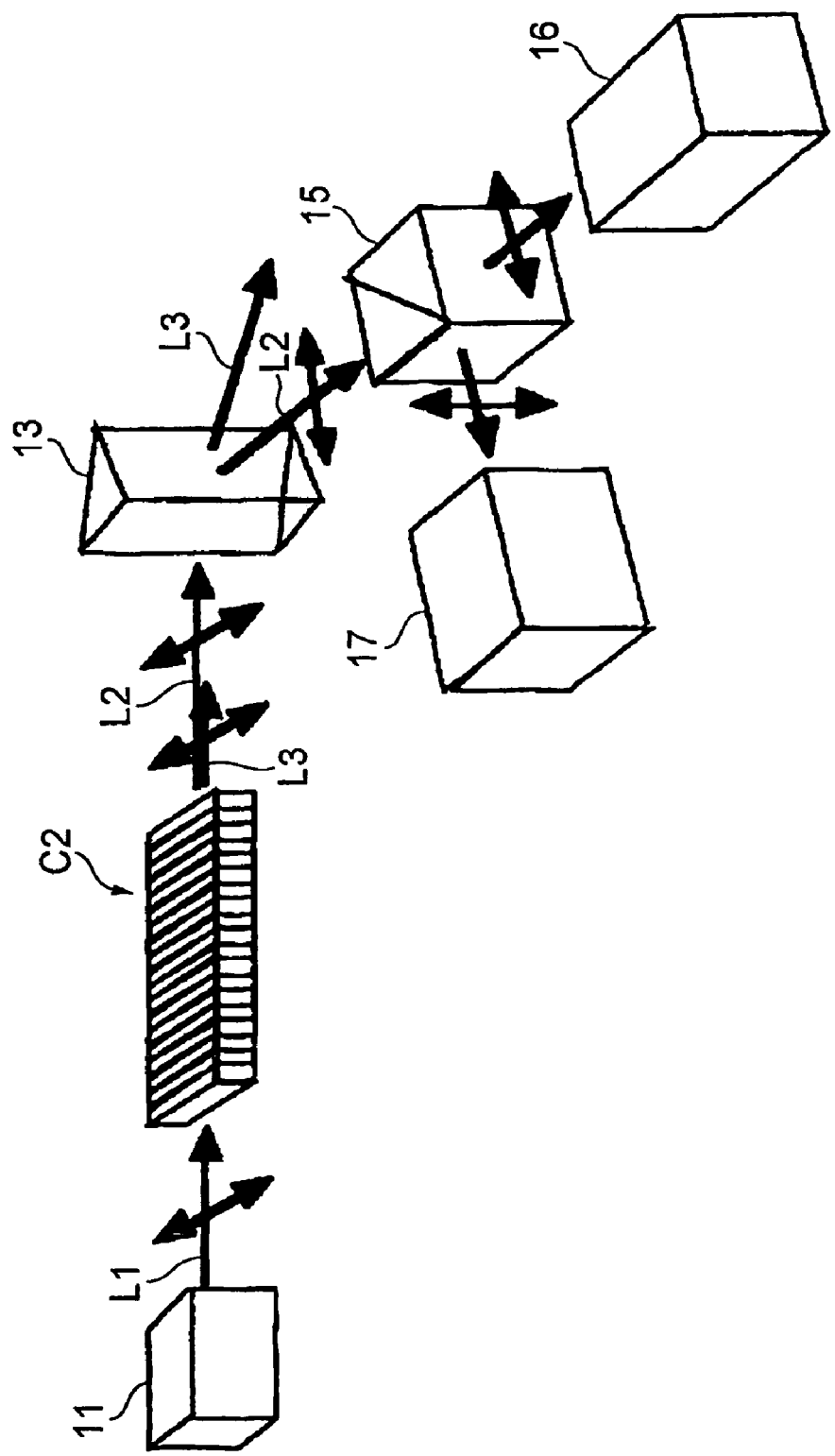
FIG. 13 is a drawing showing a schematic configuration of an experiment instrument used in the experimental example of the second embodiment.

A setup of an experiment instrument is shown in FIG. 13. The fundamental wave light source 11 used herein is a Nd:YAG laser (wavelength: 1064 nm). The fundamental wave L1 is made incident in a linearly polarized light state parallel to the X-axis of the quartz crystal and in the incidence direction substantially perpendicular to the polarity direction into the QPM quartz crystal element C2, and the second harmonic (532 nm) L2 generated by the wavelength conversion is output as linearly polarized light parallel to the X-axis as the fundamental wave is. On the other hand, the remaining fundamental wave L3 not used in the wavelength conversion is output as linearly polarized light parallel to the X-axis as it is. The second harmonic L2 and the fundamental wave L3 are separated by a prism and the detectors 16, 17 measure the output.

At this time, the setup is so arranged that only the detector 16 detects the signal when the second harmonic L2 generated is linearly polarized light parallel to the X-axis as expected. In this case, when the second harmonic L2 is linearly polarized light perpendicular to the X-axis, only the detector 17 detects the signal; if the second harmonic L2 is elliptically polarized light, or linearly polarized light the vibration plane of which is inclined from the X-axis, the detector 16 and the detector 17 both detect the signal.

It was confirmed by the result of the experiment that with the incident fundamental wave L1 having the average pulse laser output of 3.1 W, the repetition frequency of 30 kHz, the pulse time width of 8.8 nsec, and the beam diameter of 200 the detector 16 detected the signal of the second harmonic at 108 mW and the wavelength conversion from 1064 nm to 532 nm by the phase matching of linearly polarized light was achieved. It was also confirmed that the signal was mostly detected by the detector 16 only and the second harmonic L2 was the linearly polarized light parallel to the X-axis.

Third Embodiment

The first embodiment was the proposal of the novel phase matching method making use of circularly polarized light, in the Z-axis direction in which the polarization state of circularly polarized light was preserved in the crystal. The second embodiment was the proposal of the phase matching method making use of the special crystal orientation in which the state of linearly polarized light was preserved in the crystal, as in the case of the conventional phase matching. Then, the following will describe how we should consider the crystal orientations located between them.

As described previously, the linearly polarized light in the crystal with optical rotatory power is nothing but the state of superposition of right-handed elliptically polarized light and left-handed elliptically polarized light with different refractive indices. Then the ellipticity thereof is a quantity determined depending on crystal orientations. In such crystal orientations neither phase matching by circularly polarized light nor phase matching by linearly polarized light is perfect. For example, in crystal orientations where the ellipticity is close to 0, the phase matching by linearly polarized light is approximately effected. The meaning of approximately is that the wavelength conversion is not effectively implemented in part because of the optical rotatory power and the nonlinear optical effect intrinsic to the crystal is not utilized 100% effectively. In crystal orientations where the ellipticity is close to 1, the phase matching by circularly polarized light is approximately effected. In a region where the ellipticity is an intermediate value being neither 0 nor 1, it is necessary to inject the fundamental wave in a polarization state suitable for the crystal orientation thereof.

The fundamental wave can be made incident in an arbitrary polarization state by making use of a half wave plate and a quarter wave plate, thereby realizing an optimal phase matching condition. The half wave plate can rotate only the vibration direction of linearly polarized light while keeping it as linearly polarized light. In this case, the incident linearly polarized light is transferred to the opposite side of the fast axis of the half wave plate while it remains as linearly polarized light. Therefore, by changing the fast axis direction relative to the incident linearly polarized light while rotating the half wave plate, it is possible to obtain linearly polarized light with an arbitrary vibration direction. The quarter wave plate can convert linearly polarized light into elliptically polarized light. The ellipticity in this case can be obtained as an arbitrary value by selecting an angle between the vibration direction of linearly polarized light and the fast axis of the quarter wave plate.

For example, when the angle between the vibration direction of incident linearly polarized light and the fast axis of the quarter wave plate is 0°, we can obtain still linearly polarized light with the ellipticity of 0; when the angle is 90°, we can obtain circularly polarized light with the ellipticity of 1. Therefore, by rotating the quarter wave plate to vary the fast axis direction relative to the incident linearly polarized light, it is possible to obtain elliptically polarized light with an arbitrary ellipticity. In this case, however, the principal axis directions of the ellipse are also uniquely determined by the angle between the vibration direction of incident linearly polarized light and the fast axis of the quarter wave plate, and therefore the principal axis directions cannot be freely selected. Then, by suitably combining the half wave plate and the quarter wave plate, we can produce elliptically polarized light with an arbitrary ellipticity having arbitrary principal axis directions. This permits us to make the fundamental wave in an arbitrary polarization state and to find an optimal phase matching condition. The combination of the half wave plate and the quarter wave plate can be replaced by a Babinet-Soleil phase compensator or the like.

Figure 14:
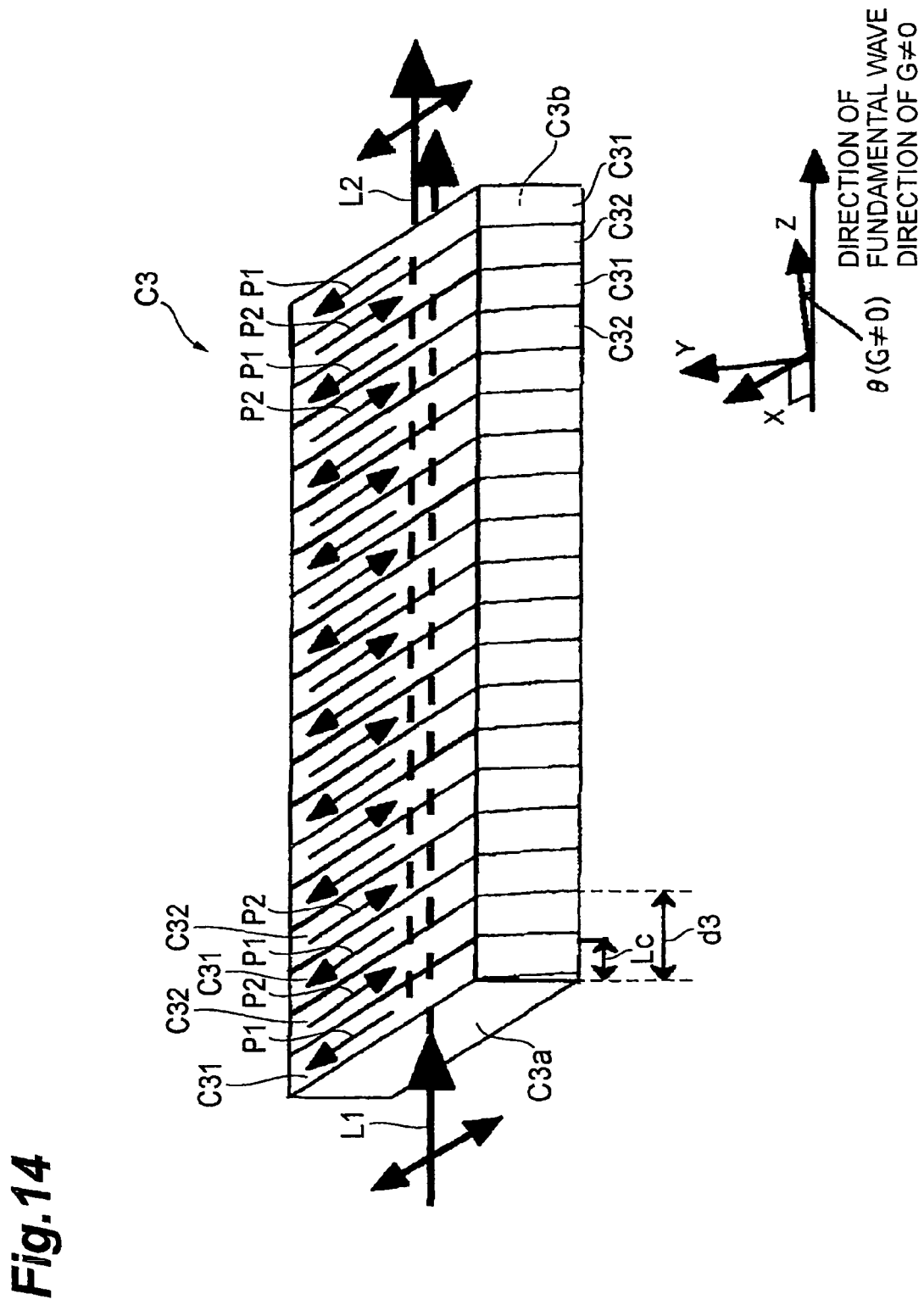
FIG. 14 is a drawing showing a schematic configuration of an element used in an experimental example of the third embodiment.

It is, however, inevitable in this case that the traveling direction of light is a direction largely inclined relative to the periodic boundaries of the periodic structure, as shown in FIG. 14. This is because the twin boundaries of the quartz crystal must be the {0001} planes perpendicular to the Z-axis for the crystallographic reason. FIG. 14 shows a quartz crystal C3 having the periodic structure in the Z-axis direction, in which the polarities in the X-axis direction are periodically inverted (the polarity directions are indicated by arrows in FIG. 14) and in which the boundaries between domains with different polarities are perpendicular to the Z-axis direction (i.e., the {0001} planes). In FIG. 14, the fundamental wave L1 of linearly polarized light is incident into the entrance end face C3a and the second harmonic L2 of linearly polarized light emerges from the exit end face C3b. In this case, there arises a problem that a phase shift occurs in the beam of the second harmonic. It is, therefore, preferable to achieve the phase matching in the Z-axis direction in which the second harmonic generation can be implemented in the direction perpendicular to the periodic boundaries. In FIG. 14, the fundamental wave is made incident from a direction of G≠0.

In every crystal with optical rotatory power, the eigen-polarizations are always elliptically polarized light in orientations except for the crystal orientation where the ellipticity is 0 (orientation where the gyration tensor G is 0) and the orientation where the ellipticity is 1 (orientation where the eigen-polarizations are circularly polarized light). Therefore, the present embodiment is a technique applicable to all the crystals with optical rotatory power.

However, a more specific periodic structure for achieving the phase matching by quasi phase matching differs depending upon the symmetry of the crystal used and the way of phase matching. The following forms show expressions including all of them.

[Math 72]

$$d = \frac{m\lambda}{2(n_1(2\omega) - n_1(\omega))} \quad (3)$$

$$d = \frac{m\lambda}{2(n_1(2\omega) - n_2(\omega))} \quad (4)$$

$$d = \frac{m\lambda}{2(n_2(2\omega) - n_1(\omega))} \quad (5)$$

$$d = \frac{m\lambda}{2(n_2(2\omega) - n_2(\omega))} \quad (6)$$

In the above expression, however, $\lambda$ represents the wavelength of the fundamental wave, $n_1$ and $n_2$ the refractive indices of two orthogonal eigen-polarizations in the ray direction, $n_1(2\omega)$ the refractive index of the second harmonic, $n_1(\omega)$ the refractive index of the fundamental wave, $n_2(2\omega)$ the refractive index of the second harmonic, $n_2(\omega)$ the refractive index of the fundamental wave, and m an order of QPM and natural number.

In the biaxial optical crystal in which the three principal values of the index ellipsoid are different from each other, $n_1$ and $n_2$ can be simply considered as refractive indices of two orthogonal eigen-polarizations in the crystal orientation (ray direction) in which the phase matching is achieved. These values can be readily calculated from the index ellipsoid of the crystal after the crystal orientation of the crystal used is determined. Formula (3) or Formula (6) is applied to the phase matching in which the polarization of the fundamental wave is parallel to the polarization of the harmonic, and Formula (4) or Formula (5) is applied to the phase matching in which the polarization of the fundamental wave is perpendicular to the polarization of the harmonic.

In the case of the uniaxial optical crystal in which only one principal value is different from the others of the three principal values of the index ellipsoid, it can be considered that $n_1$ is the ordinary index $n_o$ and $n_2$ the extraordinary index in the crystal orientation where G is substantially 0. An ordinary ray in a uniaxial optical crystal is light with a property of having a fixed index value in all the crystal orientations, and thus $n_1$ is a fixed value $n_o$ independent of the crystal orientations. On the other hand, when the crystal orientation in which the phase matching is achieved, i.e., the crystal orientation in which the ray travels is expressed by an angle θ from the optical axis of the index ellipsoid, the refractive index of extraordinary light can be expressed by the following.

[Math 73]

$$\sqrt{\frac{n_0^2 \times n_e^2}{n_e^2 \cos^2\theta + n_0^2 \cos^2\theta}}$$

It is the refractive index of extraordinary light in the orientation perpendicular to the optical axis herein.

Therefore, for example, in a case where the quasi phase matching using the nonlinear optical effect of d12 is achieved in a crystal in point group 32 which is a nonlinear optical crystal with optical rotatory power and uniaxial optical crystal, the incident fundamental wave is extraordinary light while the harmonic generated is ordinary light; therefore, the periodic structure can be expressed by the below expression with replacements of $n_1 = n_o$ and $n_2$ as defined below, in Formula (5).

[Math 74]

$$n_2 = \sqrt{\frac{n_0^2 \times n_e^2}{n_e^2 \cos^2\theta + n_0^2 \cos^2\theta}}$$

[Math 75]

$$d = \frac{m\lambda}{2\left(\sqrt{\frac{n_0^2 \times n_e^2}{n_e^2 \cos^2\theta + n_0^2 \cos^2\theta}}(2\omega) - n_0(\omega)\right)}$$

Particularly, in a case where the quasi phase matching is achieved using the nonlinear optical effect of d11, the incident fundamental wave and the generated harmonic both are ordinary light and thus the periodic structure is expressed by the following expression with replacement of $n_1 = n_o$ in Formula (3).

[Math 76]

$$d = \frac{m\lambda}{2(n_0(2\omega) - n_0(\omega))}$$

Therefore, there is no need for giving consideration to the anisotropy of refractive index depending upon crystal orientations, for the periodic structure itself. A below-described experimental example of the third embodiment shows an example of quasi phase matching using the nonlinear optical effect of d11 of the quartz crystal, corresponding to this condition.

The crystal point groups with optical rotatory power are classified into three classes of optically isotropic crystals, uniaxial optical crystals, and biaxial optical crystals as follows. (It should be, however, noted that in the following expression a notation for axes of rotatory inversion to originally be provided with "–" above each numeral is replaced by a notation of "–" in front of each numeral for the reason of word-processing software. Examples: –4, –42m, etc.)

Optically isotropic crystals: point group 23 and point group 432;

Uniaxial optical crystals: point group 3, point group 32, point group 6, point group 622, point group 4, point group 422, point group −4, and point group −42m;

Biaxial optical crystals: point group 1, point group 2, point group m, point group mm2, and point group 222.

On the other hand, the crystal point groups having the nonlinear optical effect are as follows.

Uniaxial optical crystals: point group 3, point group 32, point group 3m, point group 6, point group −6, point group 6mm, point group −6m2, point group 4, point group −4, point group 4mm, and point group −42m;

Biaxial optical crystals: point group 1, point group 2, point group m, point group mm2, and point group 222.

Therefore, the nonlinear optical crystals with optical rotatory power, which are objects of interest herein, are as follows.

Uniaxial optical crystals: point group 3, point group 32, point group 6, point group 4, point group −4, and point group −42m;

Biaxial optical crystals: point group 1, point group 2, point group m, point group mm2, and point group 222.

The method described in the experimental example of the third embodiment is effective to the crystals belonging to all the crystal point groups listed herein. In this connection, the period of quasi phase matching can be expressed by the aforementioned expression, for each of the uniaxial optical crystals and the biaxial optical crystals.

This phase matching method is not applicable only to the quasi phase matching, but is also naturally applicable to the ordinary phase matching using the birefringence.

Experimental Example of Third Embodiment

An experimental example of the third embodiment shows the phase matching in the crystal orientation where the ellipticity is approximately 0.5, by the QPM quartz crystal. The QPM quartz crystal element in this case is an element C3 as shown in FIG. 14. The angle between the ray direction and the Z-axis is 5° and the ray direction is the crystal orientation where the ellipticity is approximately 0.47 based on computation. A wavelength conversion experiment was conducted to achieve the wavelength conversion from 1064 nm to 532 nm by producing the element C3 therefor. In the element C3 as shown in FIG. 14, the polarities in the X-axis direction are periodically inverted. The boundaries between domains with different polarities are perpendicular to the Z-axis direction (i.e., the {0001} planes). The element C3 is of a plate shape of 8 mm in the length direction of travel of ray L1, 3 mm in the X-direction being the width direction, and 1 mm in the thickness direction. The end faces for incidence of the fundamental wave L1 of linearly polarized light and for emergence of the second harmonic L2 of linearly polarized light are optically polished, the entrance end face C3*a* is coated with an antireflection coating for 1064 nm light, and the exit end face C3*b* is coated with an antireflection coating for the two wavelengths of 1064 nm light and 532 nm light. The entrance end face C3*a* receives the fundamental wave L1 and the second harmonic L2 emerges from the exit end face C3*b*.

The element C3 has a plurality of first regions C31 having the polarity direction along the +X axis direction and a plurality of second regions C32 having the polarity direction along the −X direction opposite to the +X direction. The plurality of first and second regions C31, C32 are formed as alternately arranged in the period d3 between the entrance end face C3*a* and the exit end face C3*b*.

The coherence length (Lc), which is a distance where the phase difference becomes π between second harmonics continually generated in the optical path of the fundamental wave L1, i.e., the distance where the cancellation of second harmonics starts, is as follows in the present experiment condition, where λ is the wavelength of the fundamental wave L1, $n_o(\omega)$ is the ordinary index of the fundamental wave L1, and $n_o(2\omega)$ is the refractive index of the second harmonic.

[Math 77]

$$Lc = \frac{\lambda}{4(n_0(2\omega) - n_0(\omega))}$$

The inversion period d3 of the periodic structure is substantially equal to d represented by the following expression.

[Math 78]

$$d = \frac{m\lambda}{2(n_0(2\omega) - n_0(\omega))}$$

In this expression m is a number indicating an order of QPM, and natural number. In the present experiment the first-order quasi phase matching was achieved and d was 42 µm. Since the present example is not the phase matching by linearly polarized light, the quantities of $n_o(\omega)$ and $n_o(2\omega)$ are not precisely physical quantities necessary for the present example in the strict sense. However, since the precise phase matching can be controlled by slightly inclining the direction of incidence of the fundamental wave, the periodic structure herein was produced by the quantities of $n_o(\omega)$ and $n_o(2\omega)$.

The element C3 was produced by making use of the twin forming phenomenon inside the quartz crystal by application of stress using a pneumatic press machine as in the experimental example of the first embodiment and the experimental example of the second embodiment. On this occasion, the target press surface with the periodic uneven structure in the quartz crystal substrate subjected to application of stress was the surface inclined at 5° to the direction of the Z-axis from the Y-axis and the incident end direction of the fundamental wave was made along the crystal orientation where the ellipticity was approximately 0.5. In this case, the twin boundaries, or boundaries between domains with different polarities are naturally selected as the {0001} planes perpendicular to the Z-axis, from the crystallographic stability of twins themselves. Therefore, the element structure is such a structure that the periodic boundaries are somewhat obliquely aligned relative to the ray as shown in FIG. 14. In the element C3, the first and second regions C31, C32 are formed as alternately arranged in the period d3 substantially equal to d expressed by the aforementioned expression, between the entrance end face C3*a* and the exit end face C3*b*.

Figure 15:
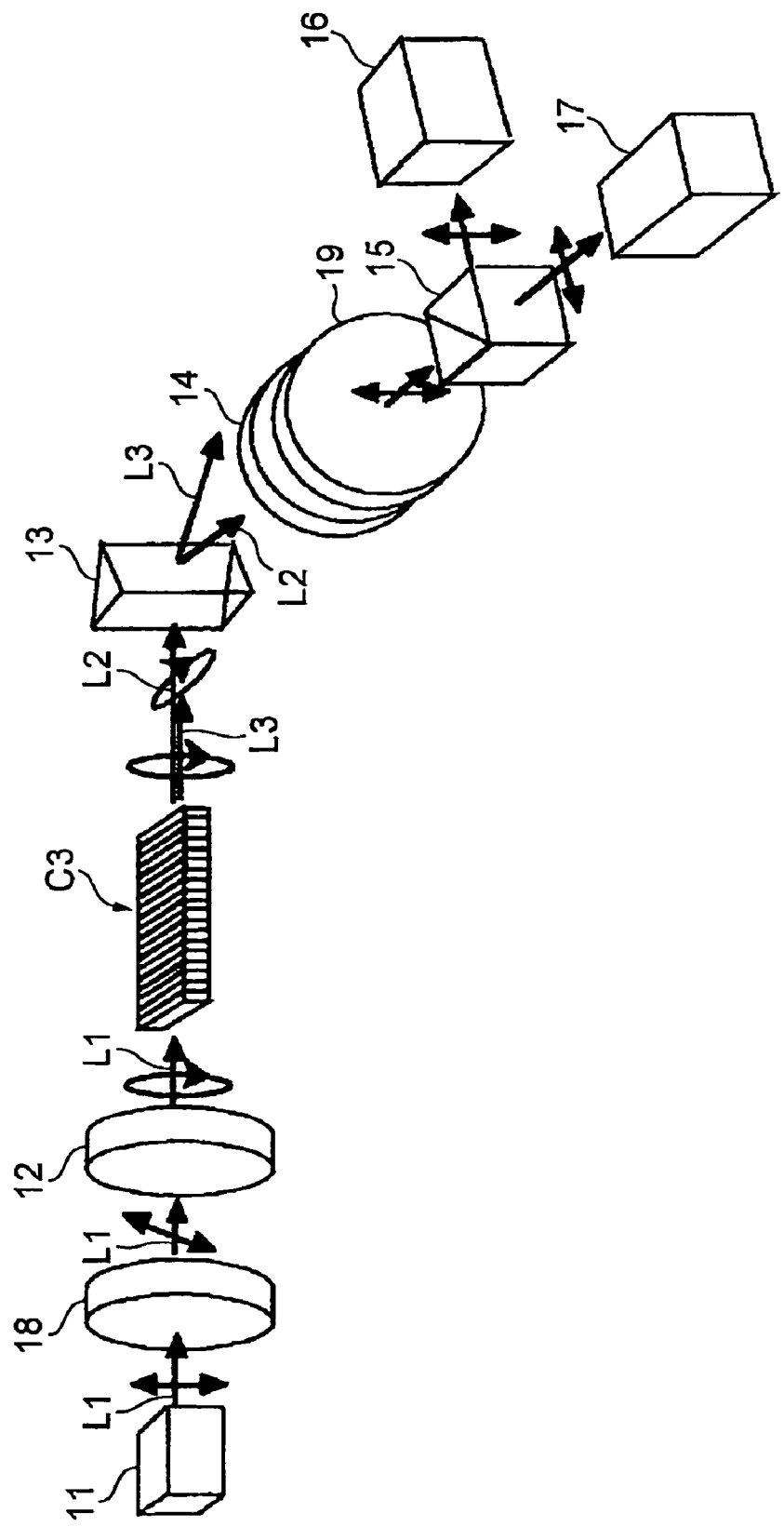
FIG. 15 is a drawing showing a schematic configuration of an experiment instrument used in the experimental example of the third embodiment.

A setup of the experiment is shown in FIG. 15. The fundamental wave light source 11 used was a Nd:YAG laser (wavelength: 1064 nm). The fundamental wave L1 of linearly polarized light was converted into desired elliptically polarized light by a half wave plate 18 and a quarter wave plate 12 for changing the axis into a desired direction, and then the fundamental wave was made incident in the incidence direction substantially perpendicular to the polarity direction into the QPM quartz crystal element C3. The second harmonic (532 nm) L2 of elliptically polarized light generated by the wavelength conversion was separated from the fundamental wave L3 of elliptically polarized light by a prism, and thereafter converted into linearly polarized light by a half wave plate 19 and a quarter wave plate 14 for second harmonic, and detectors 16, 17 measure the output. At this time, a condition for maximum output is sought by first rotating only the half wave plate 18 and quarter wave plate 12 on the incident fundamental wave side. Since the half wave plate 19 and quarter wave plate 14 on the second harmonic side are not adjusted at this time, the output is considered to be the sum of those form the detector 16 and detector 17. After the condition for maximum output is found, the half wave plate 19 and quarter wave plate 14 on the second harmonic side are adjusted to seek a condition for either one output of the detectors 16, 17 to become 0, whereby the second harmonic can be obtained as linearly polarized light.

Figure 16:
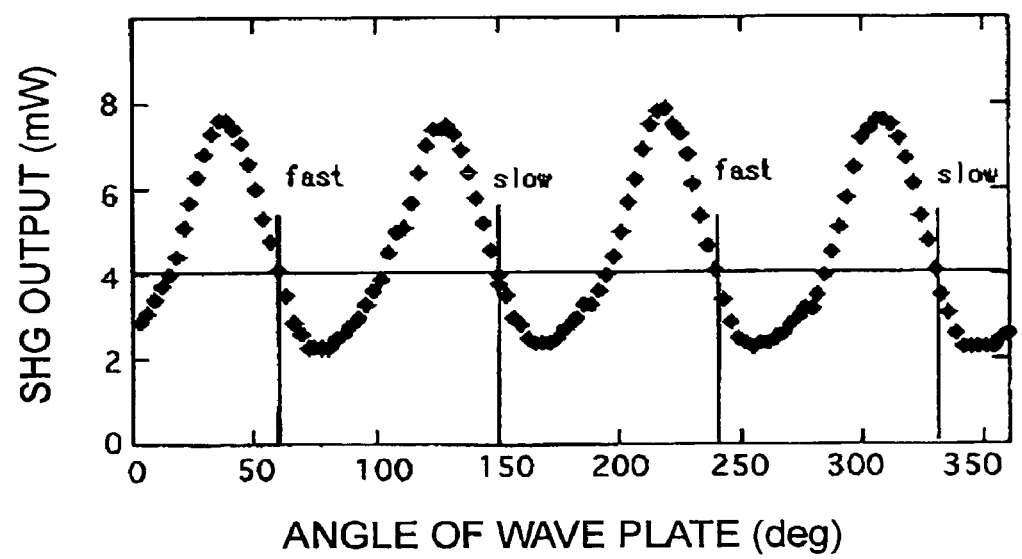
FIG. 16 is a drawing showing the result of the experiment where only a half wave plate on the fundamental wave side is singly rotated, in the experimental example of the third embodiment

FIG. 16 shows the result of the experiment where only the half wave plate 18 on the fundamental wave side was singly rotated. The graph of FIG. 16 is one showing a relation between angle of rotation of the half wave plate and SHG output, in which the horizontal axis represents the angle of the wave plate (deg) and the vertical axis the SHG output (mW). Positions of "fast" in the drawing are directions in which the vibration plane of incident linearly polarized light becomes parallel to the fast axis of the half wave plate 18, and positions of "slow" are directions in which the vibration plane of incident linearly polarized light becomes parallel to the slow axis of the half wave plate 18. Namely, it is equivalent to a situation in which the fundamental wave L1 is incident in a state of linearly polarized light. The sign convention is positive for clockwise rotation of the wave plate and negative for counterclockwise rotation thereof when viewed from the incident linearly polarized light side into the quarter wave plate 12. The experiment was conducted in such a manner that with the fundamental wave having the average pulse laser output of 0.5 W, the repetition frequency of 32 kHz, the pulse time width of 8.8 nsec, and the beam diameter of 50 μm, the output of the second harmonic was measured as a total output of the detector 16 and the detector 17. As a result, the second harmonic output was 4.05 mW when the slow axis of the half wave plate was parallel to the vibration plane of incident linearly polarized light, i.e., when the fundamental wave was incident as linearly polarized light into the QPM quartz crystal; whereas the second harmonic output showed the maximum of 7.85 mW when the angle of rotation of the wave plate was +48° from the position of fast, i.e., when the fundamental wave was made incident in a state of left-handed elliptically polarized light.

As described above, the present invention enabled the phase matching in the nonlinear optical crystals with optical rotatory power as well, while allowing the efficient wavelength conversion.

With the crystals belonging to point group 32 and point group 3, the present invention enabled the phase matching (quasi phase matching) in the Z-axis direction which had never been achieved before because of influence of the optical rotatory power. This first permitted the wavelength conversion using the nonlinear optical effect 100% in the orientation of each substance in the harmonic generation in the Z-axis direction. It also became feasible to avoid reduction in efficiency due to the optical rotatory power in the phase matching in a direction inclined from the Z-axis, whereby efficient wavelength conversion became feasible.

The present invention is effective, particularly, in the nonlinear optical crystals like the quartz crystal having a large optical rotatory power and has an extremely significant effect in the ultraviolet region where the rotatory power becomes greater. For example, the present invention made it feasible to bring out the potential of the nonlinear optical effect of the quartz crystal 100% in the Z-axis direction of the quartz crystal and also made it feasible to achieve harmonic generation, particularly, in the ultraviolet region where the conventional phase matching became almost disabled.

In addition, since the QPM element structure itself required is on an extension of the conventional concept, the present invention has a practically significant advantage that there is no demand for difficulties in production of the element.

An application of the present invention in the QPM quartz crystal element enables highly efficient generation of a coherent beam with a wavelength in the vacuum ultraviolet region of not more than 200 nm by SHG. As a result, it becomes feasible to realize a compact, alignment- and maintenance-easy, highly-operative solid laser, free of the problems of high risk and running cost being the disadvantages of the excimer lasers, at the wavelength of 193 nm. It also becomes possible to achieve continuous wave oscillation, which was impossible with the excimer lasers, at a higher repetition rate than the excimer lasers. Furthermore, the present invention allows us to readily obtain a high-efficiency coherent light source in the vacuum ultraviolet region, e.g., second harmonic generation to generate the sixth harmonic (177 nm) of YAG which has not been achieved in a practical level.

In addition, since the present invention makes use of the quasi phase matching, the phase matching is always noncritical phase matching and thus the present invention permits implementation of stable wavelength conversion easy in adjustment and resistant to temperature change and vibration and facilitates increase in efficiency depending upon the element length. Since no walk-off occurs, it is feasible to realize the wavelength conversion without deformation of the beam profile due to the conversion, which has never been achieved before in the region of not more than 200 nm.

Fourth Embodiment

Figure 17:
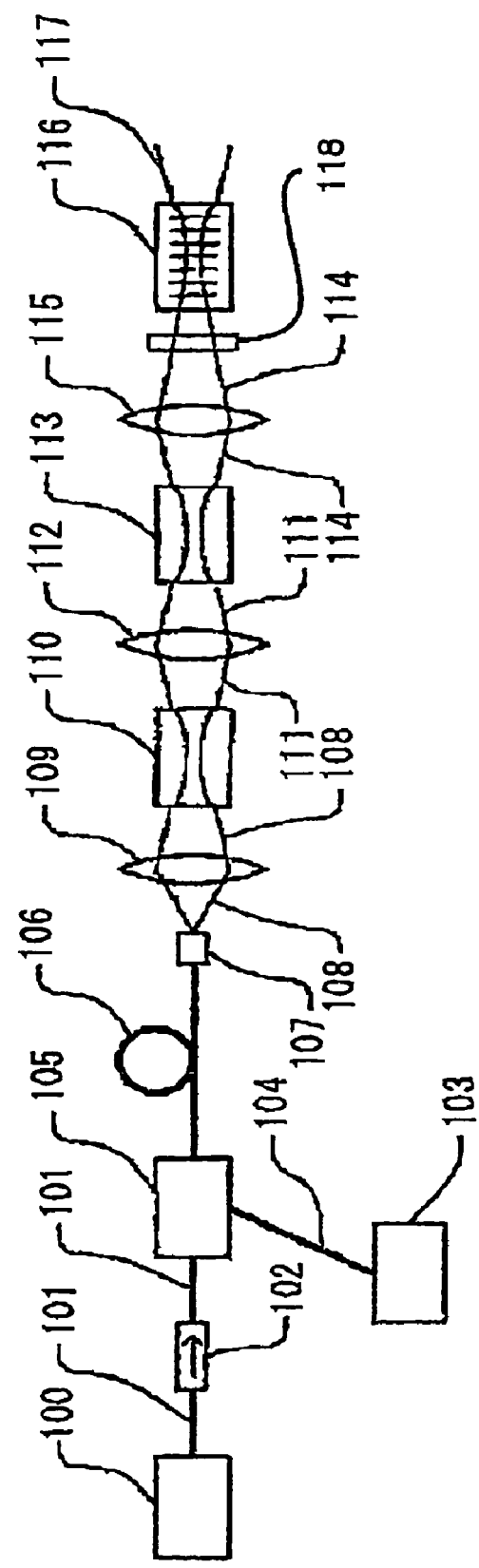
FIG. 17 is a schematic configuration diagram showing a light source device being the fourth embodiment.

FIG. 17 is a schematic configuration diagram showing a light source device being the fourth embodiment of the present invention. In the fourth embodiment of the present invention, light having the wavelength of 193 nm is generated by second harmonic generation from a laser light source for generating light at the wavelength of 386 nm.

In FIG. 17 reference numeral 100 designates a pulse-modulated InGaAsP semiconductor laser having the DFB structure. This laser is temperature-controlled by an unrepresented temperature control mechanism so as to oscillate at the wavelength of 1554 nm.

The light with the wavelength of 1554 nm emitted from the semiconductor laser 100 propagates in a single-mode optical fiber 101, passes through an isolator 102, and again propagates in a single-mode optical fiber 101. A semiconductor laser 103 can emit light with the wavelength of 980 nm or light with the wavelength of 1480 nm. The light from the semiconductor laser 103 passes through a single-mode fiber 104 to merge with the light with the wavelength of 1554 nm at an optical multiplexer 105 and the multiplexed beams are incident into an optical fiber 106 doped with a rare earth element, erbium (Er). The erbium-doped fiber herein functions to be excited by the light from the semiconductor laser 103 and amplify the light with the wavelength of 1554 nm.

The amplified light is emitted as emergent light 108 from a fiber end face or connector end face 107 into a space and is made incident into a nonlinear optical crystal LBO 110 by a lens 109. A second harmonic is generated in the nonlinear optical crystal LBO 110. This LBO 110 is one cut in the crystal orientation θ=90°, φ=0° so as to achieve type 1 non-critical phase matching, and the crystal temperature thereof is maintained at about 117° C. The nonlinear optical crystal 110 may be replaced by a quasi phase matching element of SrAlF$_5$, LiNbO$_3$, LiTaO$_3$, or KTP(KTiOPO$_4$) as well as LBO. In any case, it is feasible to achieve second harmonic generation with high efficiency and excellent beam quality, without walk-off effect.

Light 111 with the wavelength of 772 nm is condensed by a lens 112 to enter a nonlinear optical crystal LBO 113, in which it is converted into light with the wavelength of 386 nm by second harmonic generation. LBO is one cut in the crystal orientation θ=90°, φ=34.5° so as to achieve type 1 phase matching. This nonlinear optical crystal 113 may be one obtained by replacing LBO by GdYCOB(Gd$_x$Y$_{1-x}$Ca$_4$O (BO$_3$)$_3$). In GdYCOB, the birefringence can be controlled by changing a composition ratio of Gd and Y, so that the phase matching property can be varied. By appropriately changing the composition ratio of Gd and Y, therefore, it is feasible to achieve the second harmonic conversion of the light with the wavelength of 772 nm by type 1 non-critical phase matching in the crystal orientation φ=90°, θ=90°. In this case, light with the wavelength of 386 nm is obtained with higher efficiency and better beam quality than in the case of the second harmonic generation by the LBO crystal which cannot reach non-critical phase matching at the wavelength of 772 nm.

The nonlinear optical crystal 113 may be replaced by a quasi phase matching element of SrAlF$_5$, LiNbO$_3$, LiTaO$_3$, or KTP(KTiOPO$_4$). In any case, it is feasible to achieve the second harmonic generation with high efficiency and excellent beam quality, without walk-off effect.

In the light source device of the present embodiment, the wavelength conversion element of the first embodiment is used as a wavelength conversion element 116 to generate light 117 with the wavelength of 193 nm being the second harmonic from the light 114 with the wavelength of 386 nm. The light 114 of linearly polarized light with the wavelength of 386 nm passes through a lens 115 and a quarter wave plate 118 to be converted into circularly polarized light, and it is incident perpendicularly to the polarity direction of the wavelength conversion element 116. Since the polarity inversion structure is formed in the predetermined period based on the refractive index for circularly polarized light, inside the wavelength conversion element 116, as described in the first embodiment, it can generate the second harmonic of circularly polarized light with the wavelength of 193 nm with high efficiency by quasi phase matching.

The quarter wave plate 118 in the present embodiment can be properly selected from wavelength plates made of known materials such as quartz, magnesium fluoride, and sapphire. The second harmonic with the wavelength of 193 nm obtained by the light source device of the present embodiment is the circularly polarized light, but the device may be modified so as to obtain elliptically polarized light or linearly polarized light by further providing a wave plate at the exit end, depending upon a purpose of use of the light source device.

Fifth Embodiment

Figure 18:
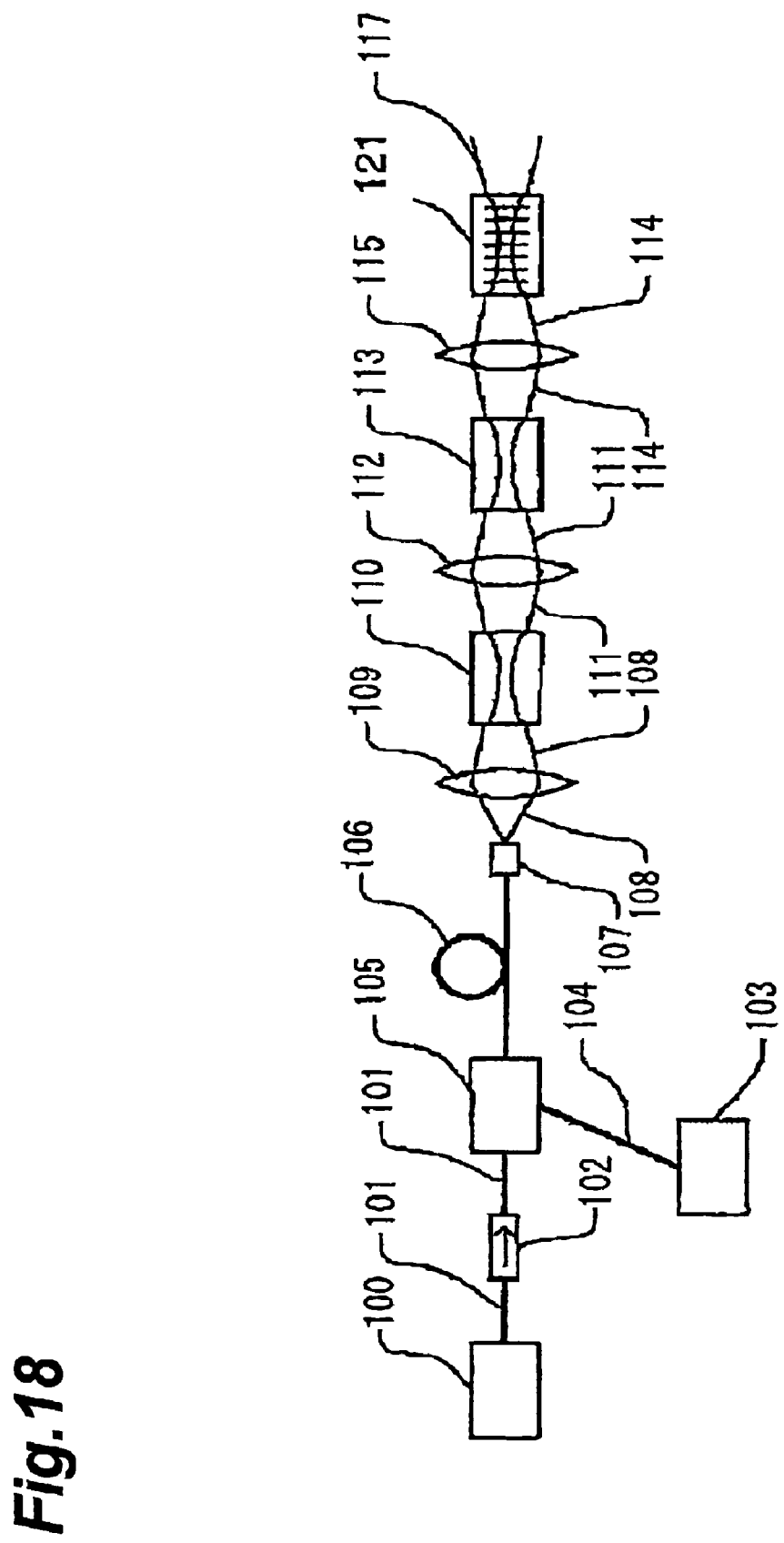
FIG. 18 is a schematic configuration diagram showing a light source device being the fifth embodiment of the present invention.

FIG. 18 is a schematic configuration diagram showing a light source device being the fifth embodiment of the present invention.

In the light source device of the present embodiment, the components from the semiconductor laser 100 of the wavelength of 1554 nm to generation of the light 114 with the wavelength of 386 nm are the same as those in the fourth embodiment and thus the description thereof is omitted herein.

The light source device of the present embodiment is constructed using the wavelength conversion element of the second embodiment as a wavelength conversion element 121. Namely, the polarity inversion structure is formed in the predetermined period based on the refractive index in the crystal orientation where the gyration tensor G is 0, inside the wavelength conversion element 121. The light 114 of linearly polarized light with the wavelength of 386 nm is incident from the crystal orientation where the gyration tensor G of the wavelength conversion element 121 is 0, to generate the light 117 with the wavelength of 193 nm. In the light source device of the present embodiment, the second harmonic with the wavelength of 193 nm generated by the wavelength conversion element 121 is linearly polarized light, but the device may be modified so as to obtain elliptically polarized light or circularly polarized light by further locating a wave plate at the exit end, depending upon a purpose of use of the light source device. A configuration of an available wave plate is the same as in the fourth embodiment.

Sixth Embodiment

Figure 19:
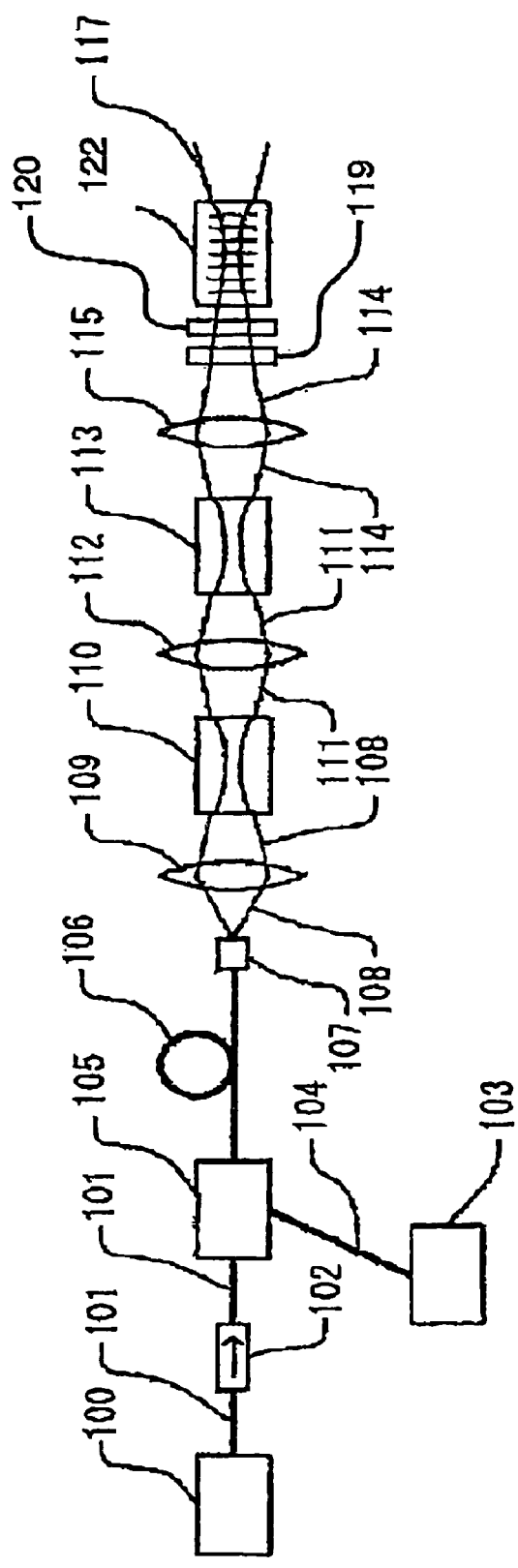
FIG. 19 is a schematic configuration diagram showing a light source device being the sixth embodiment of the present invention.

FIG. 19 is a schematic configuration diagram showing a light source device being the sixth embodiment of the present invention.

In the light source device of the present embodiment, the components from the semiconductor laser 100 of the wavelength of 1554 nm to generation of the light 114 with the wavelength of 386 nm are the same as those in the fourth embodiment and the description thereof is omitted herein.

The light source device of the present embodiment is constructed using the wavelength conversion element of the third embodiment as a wavelength conversion element 122. Namely, the wavelength conversion element 122 is an element in which the eigen-polarization in the crystal orientation where the light 114 with the wavelength of 386 nm is incident is elliptically polarized light and inside of which the polarity inversion structure is formed in the period calculated based on the expression in the third embodiment, according to the incidence direction of ray and the symmetry of the crystal. The light of linearly polarized light 114 with the wavelength of 386 nm travels through a half wave plate 119 and a quarter wave plate 120 to enter the wavelength conversion element 122. In the present embodiment, the ellipticity and principal axis direction of the beam incident into the wavelength conversion element 122 can be optionally adjusted by adjusting the angle of rotation of each wave plate, whereby the incident light in an optimal polarization state can be produced according to the configuration of the wavelength conversion element 122. Therefore, efficient phase matching can also be achieved in the nonlinear optical crystal with optical rotatory power.

The second harmonic with the wavelength of 193 nm obtained by the light source device of the present embodiment is elliptically polarized light, but the device may be modified so as to obtain circularly polarized light or linearly polarized light by further locating a wave plate at the exit end, depending upon a purpose of use of the light source device. A configuration of an available wave plate is the same as in the fourth embodiment.

The embodiments of the light source devices described above showed the configurations for generating the light with the wavelength of 193 nm from the semiconductor laser with the wavelength of 1554 nm, but embodiments of the present invention are not limited to the above configurations. For example, the wavelength conversion elements and wavelength conversion methods of the embodiments of the present invention are also applicable to a light source device configured to generate a third harmonic with the wavelength of 355 nm by sum frequency generation from the fundamental wave of the Nd:YAG laser with the wavelength of 1064 nm and the second harmonic (532 nm) and to generate the second harmonic with the wavelength of 177 nm from this light with the wavelength of 355 nm.

EFFECT OF THE INVENTION

The embodiments according to the present invention provides the wavelength conversion elements capable of efficiently generating the second harmonic from the fundamental wave and, the phase matching methods and light source devices using them.

It should be noted that the embodiment explained above was described for easier understanding of the present invention but not for restricting the present invention. Therefore, each of the elements disclosed in the above embodiment is intended to embrace all design changes and equivalents belonging to the technical scope of the present invention. Each of the constituent elements and others in the above embodiment can be applied in any combination or the like.

What is claimed is:

1. A wavelength conversion element comprising a monocrystalline nonlinear optical crystal belonging to point group 32 or point group 3,
wherein the nonlinear optical crystal has: a plurality of first regions having a polarity direction along a predetermined direction; a plurality of second regions having a polarity direction opposite to the predetermined direction; an entrance face into which a fundamental incident wave having a wavelength λ and a frequency ω is incident in a direction substantially perpendicular to the predetermined direction; and an exit face from which a second harmonic with a frequency 2ω generated in the crystal emerges, and
wherein the plurality of first and second regions are formed as alternately arranged in a period substantially equal to d expressed by Formula (1) or Formula (2) below, along a Z-axis direction of the crystal between the entrance face and the exit face,

[Math 79]

$$d = \frac{m\lambda}{2(n^+(2\omega) - n^-(\omega))} \quad (1)$$

$$d = \frac{m\lambda}{2(n^-(2\omega) - n^+(\omega))} \quad (2)$$

where $n^+(2\omega)$ is a refractive index of right-handed circularly polarized light in the Z-axis direction of the nonlinear optical crystal for the second harmonic, $n^+(\omega)$ a refractive index of right-handed circularly polarized light in the Z-axis direction of the nonlinear optical crystal for the fundamental incident wave, $n^-(2\omega)$ a refractive index of left-handed circularly polarized light in the Z-axis direction of the nonlinear optical crystal for the second harmonic, $n^-(\omega)$ a refractive index of left-handed circularly polarized light in the Z-axis direction of the nonlinear optical crystal for the fundamental incident wave, and m an order of QPM (quasi phase matching) and natural number.

2. The wavelength conversion element according to claim 1, wherein the nonlinear optical crystal is a quartz crystal.

3. The wavelength conversion element according to claim 1, further comprising a quarter wave plate,
wherein the quarter wave plate is arranged so that the fundamental incident wave having passed through the quarter wave plate is made incident into the entrance face of the nonlinear optical crystal.

4. A light source device comprising a laser light source and a wavelength conversion element, in which the wavelength conversion element generates and emits a second harmonic of a laser beam emitted from the laser light source, wherein the wavelength conversion element is the wavelength conversion element as set forth in claim 1.

5. A phase matching method of making a fundamental incident wave incident as circularly polarized light from a direction perpendicular to the polarity direction, into the wavelength conversion element as set forth in claim 4, and outputting a second harmonic.

6. A wavelength conversion method of making a fundamental incident wave having a wavelength λ and a frequency ω, incident into a wavelength conversion element comprising a monocrystalline nonlinear optical crystal belonging to point group 32 or point group 3, and obtaining a second harmonic with a frequency 2ω emitted from the wavelength conversion element, thereby to achieve wavelength conversion, the method comprising:
preparing the wavelength conversion element which has a plurality of first regions having a polarity direction along a predetermined direction, and a plurality of second regions having a polarity direction opposite to the predetermined direction, and in which the plurality of first and second regions are formed as alternately arranged in a period substantially equal to d expressed by Formula (1) or Formula (2) below, along a Z-axis direction of the crystal; and
making the fundamental incident wave incident as circularly polarized light from a direction substantially perpendicular to the predetermined direction, into the wavelength conversion element to obtain the second harmonic,

[Math 80]

$$d = \frac{m\lambda}{2(n^+(2\omega) - n^-(\omega))} \quad (1)$$

$$d = \frac{m\lambda}{2(n^-(2\omega) - n^+(\omega))} \quad (2)$$

where $n^+(2\omega)$ is a refractive index of right-handed circularly polarized light in the Z-axis direction of the nonlinear optical crystal for the second harmonic, $n^+(\omega)$ a refractive index of right-handed circularly polarized light in the Z-axis direction of the nonlinear optical crystal for the fundamental incident wave, $n^-(2\omega)$ a refractive index of left-handed circularly polarized light in the Z-axis direction of the nonlinear optical crystal for the second harmonic, $n^-(\omega)$ a refractive index of left-handed circularly polarized light in the Z-axis direction of the nonlinear optical crystal for the fundamental incident wave, and m an order of QPM (quasi phase matching) and natural number.

7. A wavelength conversion element wherein in a nonlinear optical crystal belonging to point group 32 or point group 3, which is a monocrystal having the positive polarity in a predetermined direction, a periodic polarity inversion structure in which the positive and negative polarities periodically alternate in a Z-axis direction in a width (d) expressed by Formula (1) or Formula (2) below, is formed, and wherein a direction of incidence of incident light is a direction perpendicular to the polarity direction,

[Math 94]

$$d = \frac{m\lambda}{2(n^+(2\omega) - n^-(\omega))} \quad (1)$$

$$d = \frac{m\lambda}{2(n^-(2\omega) - n^+(\omega))} \quad (2)$$

where $\lambda$ is a wavelength of a fundamental wave, $n^+(2\omega)$ a refractive index of right-handed circularly polarized light in the Z-axis direction of the second harmonic, $n^+(\omega)$ a refractive index of right-handed circularly polarized light in the Z-axis direction of the fundamental wave, $n^-(2\omega)$ a refractive index of left-handed circularly polarized light in the Z-axis direction of the second harmonic, $n^-(\omega)$ a refractive index of left-handed circularly polarized light in the Z-axis direction of the fundamental wave, and m an order of QPM and natural number.

8. A light source device comprising a laser light source and a wavelength conversion element, in which the wavelength conversion element generates and emits a second harmonic of a laser beam emitted from the laser light source, wherein the wavelength conversion element is the wavelength conversion element as set forth in claim 7.

* * * * *

UNITED STATES PATENT AND TRADEMARK OFFICE
CERTIFICATE OF CORRECTION

| | | |
|---|---|---|
| PATENT NO. | : 8,264,766 B2 | Page 1 of 1 |
| APPLICATION NO. | : 12/588501 | |
| DATED | : September 11, 2012 | |
| INVENTOR(S) | : Kenichi Muramatsu et al. | |

It is certified that error appears in the above-identified patent and that said Letters Patent is hereby corrected as shown below:

Column 51, Lines 66-67, In Claim 3, delete "The wavelength conversion element according to claim 1, further comprising a quarter wave plate," and insert -- The wavelength conversion element according to claim 1 or 2, further comprising a quarter wave plate, --, therefor.

Signed and Sealed this
Nineteenth Day of March, 2013

Teresa Stanek Rea
*Acting Director of the United States Patent and Trademark Office*